(12) United States Patent
Clemens et al.

(10) Patent No.: US 6,518,359 B1
(45) Date of Patent: Feb. 11, 2003

(54) POLYURETHANE-BASED PRESSURE-SENSITIVE ADHESIVES, SYSTEMS FOR SUCH ADHESIVES, ARTICLES THEREFROM, AND METHODS OF MAKING

(75) Inventors: Lawrence M. Clemens, Minneapolis, MN (US); Richard G. Hansen, Mahtomedi, MN (US)

(73) Assignee: 3M Innovative Properties Co., St. Paul, MN (US)

( * ) Notice: Subject to any disclaimer, the term of this patent is extended or adjusted under 35 U.S.C. 154(b) by 0 days.

(21) Appl. No.: 09/514,123

(22) Filed: Feb. 25, 2000

(51) Int. Cl.$^7$ ................................................ C08G 18/48
(52) U.S. Cl. ........................ 524/840; 528/59; 528/76; 528/905; 428/423.7; 428/424.8; 428/425.5; 428/355 N
(58) Field of Search ........................ 528/76, 59, 905; 428/423.7, 424.8, 425.5, 355 N; 524/840

(56) References Cited

U.S. PATENT DOCUMENTS

| | | |
|---|---|---|
| 3,246,049 A | 4/1966 | Webber |
| 3,360,599 A | 12/1967 | Nyberg et al. |
| 3,437,622 A | 4/1969 | Dahl |
| 3,503,917 A | 3/1970 | Burke, Jr. |
| 3,515,773 A | 6/1970 | Dahl |
| 3,718,712 A | 2/1973 | Tushaus |
| 3,767,040 A | 10/1973 | Tashaus |
| 3,796,678 A | 3/1974 | Bartizal |
| 3,879,248 A | 4/1975 | Kest |
| 3,925,283 A | 12/1975 | Dahl |
| 4,087,392 A | 5/1978 | Hartmann et al. |
| 4,123,403 A | 10/1978 | Warner et al. |
| 4,985,491 A | 1/1991 | Reisch |
| 5,037,864 A | 8/1991 | Anand et al. |
| 5,102,714 A | 4/1992 | Mobley et al. |
| 5,354,807 A | 10/1994 | Dochniak |
| 5,354,808 A | 10/1994 | Onwumere et al. |
| 5,442,028 A | 8/1995 | Fromwiller et al. |
| 5,486,570 A | 1/1996 | St. Clair |
| 5,532,058 A | 7/1996 | Rolando et al. |
| 5,554,686 A | 9/1996 | Frisch, Jr. et al. |
| 5,576,382 A * | 11/1996 | Seneker et al. |
| 5,591,820 A | 1/1997 | Kydonieus et al. |
| 5,608,000 A | 3/1997 | Duan et al. |
| 5,703,158 A | 12/1997 | Duan et al. |
| 5,714,543 A | 2/1998 | Shah et al. |
| 5,807,919 A | 9/1998 | Duan et al. |
| 5,863,980 A | 1/1999 | Choi et al. |
| 5,880,250 A | 3/1999 | Housel et al. |
| 5,910,536 A | 6/1999 | Kydonieus et al. |
| 5,985,317 A | 11/1999 | Venkateshwaran et al. |
| 6,359,100 B1 * | 3/2002 | Hostettler et al. |

FOREIGN PATENT DOCUMENTS

| | | |
|---|---|---|
| EP | 0 573 206 A1 | 12/1993 |
| EP | 0 884 336 | 12/1998 |
| GB | 1113925 | 5/1968 |
| GB | 1216672 | 12/1970 |
| JP | 87019472 | 4/1987 |
| JP | 7-102233 | 4/1995 |
| WO | WO 94/13726 | 6/1994 |
| WO | WO 97/22642 | 6/1997 |
| WO | WO 98/31760 | 7/1998 |
| WO | WO 99/15573 | 4/1999 |
| WO | WO 99/38900 | 8/1999 |

OTHER PUBLICATIONS

Polymer Science Ser. A. 1996, 18(10), 1117–22, The Structure and Properties of Pressure–Sensitive Polyurethane Adhesives.

Acclaim Polyether Polyols, Applying Innovations to Applications, "Creating New Possibilities for Polyether–Based Urethanes," by ARCO Chemical Company, 1997.

Acclaim Polyether Polyol 8200, CAS No.: 25322–69–4, by ARCO Chemical Company, 1997.

* cited by examiner

*Primary Examiner*—Rachel Gorr
(74) *Attorney, Agent, or Firm*—Scott R. Pribnow

(57) ABSTRACT

Polyurethane-based pressure-sensitive adhesives (PSAs) of the invention comprise the reaction product of: a polyol component comprising at least one diol having a weight average molecular weight of at least about 2,000, wherein the at least one diol comprises less than about 8 weight % monols; an isocyanate-functional component; an optional reactive emulsifying compound; and an optional chain extending agent. The PSAs can be prepared from 100% solids, waterborne or solventborne systems.

23 Claims, No Drawings

POLYURETHANE-BASED PRESSURE-SENSITIVE ADHESIVES, SYSTEMS FOR SUCH ADHESIVES, ARTICLES THEREFROM, AND METHODS OF MAKING

FIELD OF THE INVENTION

The present invention relates generally to polyurethane-based pressure-sensitive adhesives, systems (e.g., 100% solids, waterborne, and solventborne) for such adhesives, articles therefrom, and methods of their preparation.

BACKGROUND OF THE INVENTION

A wide variety of polyurethane-based adhesives are known. For example, see U.S. Pat. No. 5,910,536 (Kydonieus et al.), which describes a particular type of polyurethane-based adhesive—a pressure-sensitive poly[urethane-(meth)acrylate]-based adhesive. The adhesives therein are prepared from 100% solids (i.e., essentially solvent-free and water-free) systems.

In addition to 100% solids systems, it is known to produce polyurethane-based adhesives in both solventborne (i.e., those using mostly organic solvents as a solvating medium) and waterborne (i.e., those using mostly water as a dispersing medium) systems. These adhesive systems are applied to a substrate in the form of a solution or dispersion, respectively. Generally, whether the adhesive system is solventborne or waterborne, it must be coated onto a desired substrate and dried to remove solvating or dispersing medium (i.e., organic solvent or water, respectively) in order to form an adhesive coating.

Reactive polyurethane-based adhesive systems have been described in the literature, but coatable mixtures prepared from such systems generally have a limited useful life. Examples of reactive polyurethane-based adhesive systems include those described in U.S. Pat. No. 3,246,049 (Webber); U.S. Pat. No. 3,437,622 (Dahl); U.S. Pat. No. 3,718,712 (Tushaus); U.S. Pat. No. 3,879,248 (Kest); U.S. Pat. No. 3,925,283 (Dahl); U.S. Pat. No. 4,087,392 (Hartmann); U.S. Pat. No. 5,102,714 (Mobley et al.); U.S. Pat. No. 5,486,570 (St. Clair); U.S. Pat. No. 5,591,820 (Kydonieus); and U.S. Pat. No. 5,714,543 (Shah). Further descriptions include those in GB 1,113,925 (Weller); GB 1,216,672 (Grindley); and PCT Publication Number WO 97/22,642 (Chang).

In reactive systems, typically multiple parts must be mixed to form a coatable reacting mixture. The reacting mixture must then be coated onto a substrate within a short period of time. If the reacting mixture is not coated within a short period of time, the viscosity of the composition will become too high, rendering the composition uncoatable. Thus, storage-stable, coatable adhesive systems are not obtainable when the adhesive system is a reactive system.

In addition to not being storage-stable, there are other disadvantages associated with reactive systems. Typically the parts of a reactive polyurethane-based adhesive system include an isocyanate-containing part (i.e., an isocyanate-terminated polyurethane prepolymer) and a chain extending part. Due to the presence of isocyanate-functional groups on the polyurethane prepolymer, storage of that part must be carefully controlled so that moisture does not react with the isocyanate-functional groups, rendering the composition non-reactive and, thus, unusable. Sensitivity to moisture can also lead to variations in properties of these coated adhesives due to, for example, local variations in ambient temperature and humidity when the adhesive is coated. Furthermore, special handling procedures may be required for the multi-part system, especially by those that are sensitive to isocyanate chemicals.

Thus, essentially non-reactive systems are preferable over reactive systems from at least a storage stability standpoint and ease of use standpoint. Premixing of components and special storage considerations for the components are not required in non-reactive systems.

When using a non-reactive, solventborne or waterborne system, to form an adhesive coating on a substrate, one merely applies the composition, which contains a fully reacted polymer in the form of a solution or dispersion, to the substrate and then dries the solvating or dispersing medium to form the adhesive coating. However, such non-reactive systems may require the addition of external emulsifiers or cationic stabilization agents to maintain stability of the solution or dispersion prior to coating to form the adhesive.

Many polyurethane-based and polyurethane-urea-based dispersions are known in the literature. For example, see U.S. Pat. No. 5,037,864 (Anand et al.); U.S. Pat. No. 5,354,807 (Dochniak); U.S. Pat. No. 5,354,808 (Onwumere et al.); U.S. Pat. No. 5,554,686 (Frisch, Jr. et al.); U.S. Pat. No. 5,608,000 (Duan); U.S. Pat. No. 5,807,919 (Duan); and U.S. Pat. No. 5,863,980 (Choi et al.) as well as JP-07-102, 233 (Sekisui Chemical). Most of the literature references, however, do not describe how to prepare pressure-sensitive adhesive (PSA)s from the dispersions.

PSA compositions are a unique subset of adhesives well known to those of ordinary skill in the art to possess properties including the following: (1) aggressive and permanent tack, (2) adherence with no more than finger pressure, (3) sufficient ability to hold onto an adherend, and (4) sufficient cohesive strength to be removed cleanly from the adherend. Materials that have been found to function well as PSAs are polymers designed and formulated to exhibit the requisite viscoelastic properties resulting in a desired balance of tack, peel adhesion, and shear holding power.

U.S. Pat. No. 5,910,536 (Kydonieus et al.), described supra, describes how a "suitable balance of elastic and viscous properties which is required in pressure-sensitive adhesives has not been readily attainable in conventional polyurethane materials." Although Kydonieus et al. did not teach polyurethane-based PSA dispersions, they were able to obtain polyurethane-based PSAs from a 100% solids system. Yet, in order to obtain the balance of properties requisite to PSAS, the polyurethane-based PSAs described therein were poly[urethane-(meth)acrylate]-based, containing both urethane and acrylate linkages in their polymeric backbone. However, as recognized by Kydonieus et al., disadvantages with these types of polymers include the fact that acrylic-based adhesives are not as strong as polyurethane-based adhesives. Furthermore, acrylic-based adhesives, such as those described by Kydonieus et al., are generally more irritating to human skin than polyurethane-based adhesives.

Certain few references do describe preparation of PSAs from polyurethane-based dispersions. For example, PCT Publication Number WO 98/31,760 (Dow Chemical Company) describes a polyurethane PSA-forming latex composition comprising a polyurethane PSA-forming material, wherein a polyurethane PSA is obtained by dehydrating the PSA-forming latex composition. The process for preparing the polyurethane PSA includes emulsifying a polyurethane prepolymer in water, chemically reacting the prepolymer to react substantially all unreacted functional groups, and dehydrating the aqueous dispersion. The polyurethane prepolymer is formed from reactants including polyisocyanates and active hydrogen compounds, such as polyols. It is stated that polyols can be employed individually or in mixtures as di-, or a combination thereof, polyoxyalkylene polyols. Suitable active hydrogen compounds are polyols having a molecular weight less than 6,000.

Also see U.S. Pat. No. 3,796,678 (Bartizal), where highly branched, capped polyurethane dispersions for preparing PSAs are described. It is stated that at least about 20 weight percent pendant chains extend from the polyurethane and polyurethane-urea polymers therein. The polymers are formed in and dispersed in an aqueous medium.

Still further polyurethane-based chemistries for preparing PSAs are desirable. It would be particularly desirable to provide polyurethane-based PSAs that can be tailored to have a wide range of peel adhesion and shear strength properties.

SUMMARY OF THE INVENTION

Polyurethane-based pressure-sensitive adhesives (PSAs) of the invention comprise the reaction product of: a polyol component comprising at least one diol having a weight average molecular weight of at least about 2,000, wherein the at least one diol comprises less than about 8 weight % monols; an isocyanate-functional component; an optional reactive emulsifying compound; and an optional chain extending agent. The PSAs can be prepared from 100% solids, waterborne or solventborne systems. For example, the PSAs can be prepared from poly(urethane-urea) dispersions.

As a further example, a polyurethane-based PSA dispersion of the invention comprises the reaction product of: a polyol component comprising at least one diol having a weight average molecular weight of at least about 2,000, wherein the at least one diol comprises less than about 8 weight % monols; an isocyanate-functional component; an optional reactive emulsifying compound; and an optional chain extending agent, wherein the reaction product is dispersed in a dispersing medium. A polyurethane-based PSA solution of the invention comprises the reaction product of: a polyol component comprising at least one diol having a weight average molecular weight of at least about 2,000, wherein the at least one diol comprises less than about 8 weight % monols; an isocyanate-functional component; an optional reactive emulsifying compound; and an optional chain extending agent, wherein the reaction product is solvated in a solvating medium.

In one embodiment, the polyol component comprises at least one polyoxyalkylene polyol. In another embodiment, each polyol in the polyol component is a diol. In another embodiment, the at least one diol comprises a diol having a ratio of diol molecular weight to weight % monol of at least about 800, or still further, at least about 1,000, or even further, at least about 1,500.

In further embodiments of the invention, the polyol component comprises a first polyol having a weight average molecular weight of less than 2,000 and a second polyol having a weight average molecular weight of 2,000 or more. In further embodiments, the first polyol has a weight average molecular weight of less than about 1,800. In yet further embodiments, the first polyol has a weight average molecular weight of less than about 1,000.

Similarly, in further embodiments of the invention, the second polyol has a weight average molecular weight of greater than about 2,500. In even further embodiments, the second polyol has a weight average molecular weight of greater than about 6,000.

When viewed from a different angle, in a further embodiment of the invention, the weight average molecular weights of the first and second polyols differ by at least about 500. In even further embodiments, the weight average molecular weights of the first and second isocyanate-reactive materials differ by at least about 2,500.

According to one aspect of this embodiment, the second polyol comprises a majority of the polyol component based on total weight of the polyol component. For example, in one embodiment, the first polyol comprises about 1 to about 40 percent by weight of the polyol component and the second polyol comprises about 60 to about 99 percent by weight of the polyol component. In yet another embodiment, the first polyol comprises about 5 to about 25 percent by weight of the polyol component and the second polyol comprises about 75 to about 95 percent by weight of the polyol component.

In one embodiment, the isocyanate-functional component comprises a diisocyanate. In one embodiment, the reactive emulsifying compound comprises at least about 0.5% by weight of the total reactants. In another embodiment, the polyurethane-based PSA further comprises the reaction product of a chain extending agent.

PSAs of the invention may be at least partially coated on a substrate. For example, PSAs of the invention are useful in tapes. The tapes comprise a backing having a first and second side and the PSA coated on at least a portion of the first side of the backing and, optionally, on at least a portion of the second side of the backing.

A method of preparing the polyurethane-based PSAs of the invention comprises the, not necessarily sequential, steps of: providing a polyol component comprising at least one diol having a weight average molecular weight of at least about 2,000 wherein the at least one diol comprises less than about 8 weight % monols; providing an isocyanate-functional component; optionally providing a reactive emulsifying compound; allowing the polyol component, the isocyanate-functional component, and the optional reactive emulsifying compound to react to form a polyurethane prepolymer; and chain extending the polyurethane prepolymer. According to further embodiments, the method can further comprise the step of dispersing the polyurethane prepolymer in a dispersing medium. In still further embodiments, the method can further comprise the step of drying the dispersing medium to form a coating of the polyurethane-based PSA.

DETAILED DESCRIPTION OF THE PREFERRED EMBODIMENTS

Pressure-sensitive adhesives (PSAs) of the invention are polyurethane-based. For simplicity, the term "polyurethane" as used herein includes polymers containing urethane (also known as carbamate) linkages, urea linkages, or combinations thereof (i.e., in the case of poly(urethane-urea)s). Thus, polyurethane-based PSAs of the invention contain at least urethane linkages and, optionally, urea linkages. Furthermore, PSAs of the invention are based on polymers where the backbone has at least 80% urethane and/or urea repeat linkages formed during the polymerization process, such as the polymerization processes described below. That is, the polyurethane-based polymers are formed from prepolymers that are preferably terminated by isocyanate groups. Then, further reactants used to form the PSAs from the prepolymers are selected such that no more than about 20%, preferably no more than about 10%, more preferably no more than about 5%, and preferably none of the repeat linkages between polymeric segments formed in the polymeric backbone during polymerization are other than urethane and urea linkages.

PSAs of the invention are preferably prepared from systems that are essentially non-reactive. Furthermore, polyurethane-based PSA systems of the invention are preferably storage-stable. "Storage-stable" PSA systems are those compositions that can be coated on a substrate to form a continuous film at any time after the composition is formed up until the shelf life of the material has expired. Preferably, the shelf life of the material is at least three days, more preferably at least about one month, even more preferably at least about six months, and most preferably at least about one year.

PSAs of the present invention may be derived from 100% solids, solventborne or waterborne systems. Environmental and regulatory demands are prompting manufacturers of adhesives to move more rapidly from solventborne systems to waterborne systems. As compared to organic solvents, water is less costly and more environmental friendly. Furthermore, flammability and combustibility of waterborne systems is reduced as compared to solventborne systems. Thus, it is preferred that the polyurethane-based PSAs of the invention are derived from waterborne systems, using essentially only water as the dispersing medium.

Dispersions of the invention are prepared by reacting components, including at least one isocyanate-reactive (e.g., hydroxy-functional, such as polyol) component, at least one isocyanate-functional (e.g., polyisocyanate) component, and, optionally, at least one reactive emulsifying compound, to form an isocyanate-terminated polyurethane prepolymer. The polyurethane prepolymer is then dispersed, and chain-extended, in a dispersing medium to form polyurethane-based dispersions of the invention.

Components of polyurethane-based PSAs of the invention are further described below, with reference to certain terms understood by those in the chemical arts as referring to certain hydrocarbon groups. Reference is also made throughout the specification to polymeric versions thereof. In that case, the prefix "poly" is inserted in front of the name of the corresponding hydrocarbon group.

Except where otherwise noted, such hydrocarbon groups, as used herein, may include one or more heteroatoms (e.g., oxygen, nitrogen, sulfur, or halogen atoms), as well as functional groups (e.g., oxime, ester, carbonate, amide, ether, urethane, urea, carbonyl groups, or mixtures thereof).

The term "aliphatic group" means a saturated or unsaturated, linear, branched, or cyclic hydrocarbon group. This term is used to encompass alkylene (e.g., oxyalkylene), aralkylene, and cycloalkylene groups, for example.

The term "alkylene group" means a saturated, linear or branched, divalent hydrocarbon group. Particularly preferred alkylene groups are oxyalkylene groups.

The term "oxyalkylene group" means a saturated, linear or branched, divalent hydrocarbon group with a terminal oxygen atom.

The term "aralkylene group" means a saturated, linear or branched, divalent hydrocarbon group containing at least one aromatic group.

The term "cycloalkylene group" means a saturated, linear or branched, divalent hydrocarbon group containing at least one cyclic group.

The term "oxycycloalkylene group" means a saturated, linear or branched, divalent hydrocarbon group containing at least one cyclic group and a terminal oxygen atom.

The term "aromatic group" means a mononuclear aromatic hydrocarbon group or polynuclear aromatic hydrocarbon group. The term includes arylene groups.

The term "arylene group" means a divalent aromatic group.

Isocyanate-Reactive Component

Any suitable isocyanate-reactive component can be used in the present invention. The isocyanate-reactive component contains at least one isocyanate-reactive material or mixtures thereof As understood by one of ordinary skill in the art, an isocyanate-reactive material includes at least one active hydrogen. Those of ordinary skill in the polyurethane chemistry art will understand that a wide variety of materials are suitable for this component. For example, amines, thiols, and polyols are isocyanate-reactive materials.

However, it is preferred that the isocyanate-reactive material be a hydroxy-functional material. Polyols are the preferred hydroxy-functional material used in the present invention. Polyols of the invention can be of any molecular weight, including relatively low molecular weight polyols (i.e., having a weight average molecular weight of less than about 250) commonly referred to as "chain extenders" or "chain extending agents," as well as those polyols having higher molecular weights. Polyols provide urethane linkages when reacted with an isocyanate-functional component, such as a polyisocyanate.

Polyols, as opposed to monols, have at least two hydroxy-functional groups. Generally and preferably, diols are used in the present invention. Diols contribute to formation of relatively high molecular weight polymers without requiring crosslinking, such as is conventionally introduced by polyols having greater than two hydroxy-functional groups. PSAs prepared from such diols generally have increased shear strength, peel adhesion, and/or a balance thereof, to provide PSA properties that may be desired for certain applications. In contrast, polymers having a relatively large amount of crosslinking may not be suitable for many PSA applications and/or materials therefrom may not be readily processable.

Examples of polyols useful in the present invention include, but are not limited to, polyester polyols (e.g., lactone polyols) and the alkylene oxide (e.g., ethylene oxide; 1,2-epoxypropane; 1,2-epoxybutane; 2,3-epoxybutane; isobutylene oxide; and epichlorohydrin) adducts thereof, polyether polyols (e.g., polyoxyalkylene polyols, such as polypropylene oxide polyols, polyethylene oxide polyols, polypropylene oxide polyethylene oxide copolymer polyols, and polyoxytetramethylene polyols; polyoxycycloalkylene polyols; polythioethers; and alkylene oxide adducts thereof), polyalkylene polyols, mixtures thereof, and copolymers therefrom. Polyoxyalkylene polyols are preferred.

When copolymers are used, chemically similar repeating units may be randomly distributed throughout the copolymer or in the form of blocks in the copolymer. Similarly, chemically similar repeating units may be arranged in any suitable order within the copolymer. For example, oxyalkylene repeating units may be internal or terminal units within a copolymer. The oxyalkylene repeating units may be randomly distributed or in the form of blocks within a copolymer. One preferred example of a copolymer containing oxyalkylene repeating units is a polyoxyalkylene-capped polyoxyalkylene polyol (e.g., a polyoxyethylene-capped polyoxypropylene).

Certain applications will benefit from using PSAs having fewer residuals (i.e., reactive components, such as monomers, that remain unreacted in the reaction product) than conventional PSAs. Such applications include, for example, electronics applications and medical applications. The presence of residuals in PSAs used for these applications may be problematic. For example, the presence of residuals in PSAs used for electronics applications may contaminate other components in the electronic component, for example, by acting as a plasticizer. Plasticization of magnetic media in a hard disk drive could result in a shortened useful life for the hard disk drive. The presence of residuals in PSAs used for medical applications may cause irritation, sensitization, or skin trauma if the residuals migrate from the PSA to the surface in contact with skin, for example. This problem was recognized by Kydonieus et al., in U.S. Pat. No. 5,910,536, as being associated with acrylate-based adhesives. It is also foreseeable that PSAs having fewer residuals will be advantageous for use in applications having contact with, for example, food or other products for human consumption.

When higher molecular weight polyols (i.e., polyols having weight average molecular weights of at least about 2,000) are used, it is preferred that the polyol component be "highly pure" (i.e., the polyol approaches its theoretical functionality—e.g., 2.0 for diols, 3.0 for triols, etc.). These highly pure polyols preferably have a ratio of polyol molecular weight to weight % monol of at least about 800, preferably at least about 1,000, and more preferably at least about 1,500. For example, a 12,000 molecular weight polyol with 8 weight % monol has such a ratio of 1,500 (i.e., 12,000/8=1,500). Preferably, the highly pure polyol contains about 8% by weight monol or less.

Generally, as the molecular weight of the polyol increases in this preferred embodiment, a higher proportion of monol may be present in the polyol. For example, polyols having molecular weights of about 3,000 or less preferably contain less than about 1% by weight of monols. Polyols having molecular weights of greater than about 3,000 to about 4,000 preferably contain less than about 3% by weight of monols. Polyols having molecular weights of greater than about 4,000 to about 8,000 preferably contain less than about 6% by weight of monols. Polyols having molecular weights of greater than about 8,000 to about 12,000 preferably contain less than about 8% by weight of monols.

Examples of highly pure polyols include those available from Lyondell Chemical Company of Houston, Texas, under the trade designation, ACCLAIM and certain of those under the trade designation, ARCOL. To determine whether these preferred highly pure polyols were used in preparing PSAs of the invention, Nuclear Magnetic Resonance (NMR) or other suitable analytical methods can be used.

Other benefits derived from using highly pure polyols include the ability to form relatively high molecular weight polymers without requiring crosslinking, such as is conventionally introduced into polymers by polyols having greater than two hydroxy-functional groups. In comparison, for example, when conventional diols (e.g., those diols having greater than about 10% by weight or greater of monols) are used to prepare polyurethanes, higher functional polyols (e.g., triols) are also typically used in an attempt to balance the stoichiometric ratio of isocyanate-reactive (e.g., hydroxy-functional) groups to isocyanate-functional groups in the reaction mixture. It is the higher-functional polyols (i.e., those having more than two hydroxy-functional groups) that predominantly contribute to crosslinking of the polymer.

In general, preferred diols useful in the present invention can be represented by Formula I:

$$HO-R-OH \qquad (I)$$

wherein R represents an aliphatic group, aromatic group, mixtures thereof, polymers thereof, or copolymers thereof. Preferably R is a polyalkylene group, polyoxyalkylene group, or mixtures thereof Although polyols containing more than two hydroxy-functional groups are generally less preferred than diols, certain higher functional polyols may also be used in the present invention. These higher functional polyols may be used alone, or in combination with other isocyanate-reactive materials, for the isocyanate-reactive component.

In one aspect of this embodiment, these higher functional polyols are converted to diols prior to their use in the isocyanate-reactive component. After conversion, the reaction products are considered diols according to the present invention. For example, one preferred class of higher functional polyols that can be used in the present invention includes polyoxyalkylene triols, which can be reacted with a carboxylic acid cyclic anhydride or a sulfocarboxylic acid cyclic anhydride to reduce the functionality thereof The polyoxyalkylene triol is preferably polyoxypropylene or, more preferably, a polyoxypropylene polyoxyethylene copolymer. The cyclic carboxylic anhydride is preferably selected from anhydrides such as succinic; glutaric; cyclohexanedicarboxylic; methylsuccinic; hexahydro-4-methylphthalic; phthalic; 1,2,4-benzenetricarboxylic; maleic; fumaric; itaconic; 3,4,5,6-tetrahydrophthalic; 1-dodecen-1-yl succinic; cis-aconitic; and mixtures thereof. The sulfocarboxylic cyclic anhydride is preferably 2-sulfobenzoic acid cyclic anhydride.

When the triol molecular weight used to prepare such reaction products is relatively low (i.e., having a weight average molecular weight of less than 3,000), the ester-acid reaction products are preferably used in combination with another isocyanate-reactive material. The use of such lower molecular weight triols in combination with another isocyanate-reactive material may even obviate the need for the reactive emulsifying compound, which is described below, when preparing polyurethane-based dispersions of the invention. When the triols have a molecular weight of 3,000 or greater, preferably 4,500 or greater, the ester-acid reaction product is generally suitable for use without other isocyanate-reactive materials and may also obviate the need for the later described reactive emulsifying compound when preparing polyurethane-based dispersions of the invention.

For broader formulation latitude, at least two isocyanate-reactive materials, such as polyols, may be used for the isocyanate-reactive component. It has been found that using at least one material having a relatively low weight average molecular weight in combination with at least one material having a relatively high weight average molecular weight results in PSAs having significantly greater shear strength (i.e., holding power), but comparable, or still adequate, peel adhesion, as compared to those PSAs derived from isocyanate-reactive components containing a single isocyanate-reactive material. Thus, this aspect of the present invention provides PSAs that can be used in applications where higher holding power is desired, but ease of removability from the adherend is also desired. However, the ratio and types of materials in the isocyanate-reactive component mixture can be adjusted to obtain a wide range of shear strengths and peel adhesions in PSAs prepared therefrom.

The use of a mixture of materials for the isocyanate-reactive component also allows for improved costeffectiveness, where desired. For example, more expensive isocyanate-reactive materials may be mixed with less expensive isocyanate-reactive materials for the isocyanate-reactive component. This may be the case, for example, when highly pure relatively high molecular weight polyols are mixed with relatively high molecular weight polyols that are less pure or with lower molecular weight polyols.

Preferably, the mixture of isocyanate-reactive materials for the isocyanate-reactive component includes at least two diols, most preferably all polyols in the mixture are diols. As stated above, diols are preferred over other polyols due to their tendency to contribute to higher molecular weight polymers without crosslinking. Thus, if present, it is preferred that polyols other than diols comprise less than about 10% by weight, more preferably less than about 5% by weight, of the polyol component.

When using a combination of a relatively low weight average molecular weight polyol and a relatively high weight average molecular weight polyol, it is preferred that the weight average molecular weights of the two polyols differ by at least about 500, more preferably at least about 1,000, even more preferably at least about 1,500, even more preferably at least about 2,000, and most preferably at least about 2,500. For purposes of this patent, relatively low weight average molecular weight polyols are those having a weight average molecular weight of less than 2,000. Similarly, relatively high weight average molecular weight polyols are those having a weight average molecular weight of 2,000 or more.

Preferably, the relatively low weight average molecular weight polyol has a weight average molecular weight of less than about 1,800, more preferably less than about 1,600, and most preferably less than about 1,000.

Preferably, the relatively high weight average molecular weight polyol has a weight average molecular weight of greater than about 2,500, more preferably greater than about 3,000, and most preferably greater than about 3,500. In one embodiment of the invention, the relatively high weight average molecular weight polyol has a weight average molecular weight of greater than about 6,000.

The proportion of the two polyols in such a combination can vary widely. Preferably, however, a majority of the polyol component comprises a relatively high molecular weight polyol. For example, in one embodiment, the relatively low molecular weight polyol comprises about 1 to about 40 percent by weight of the polyol component. In a further embodiment, the relatively low molecular weight polyol comprises about 5 to about 25 percent by weight of the polyol component. Similarly, in one embodiment, the relatively high molecular weight polyol comprises about 60 to about 99 percent by weight of the polyol component. In a further embodiment, the relatively high molecular weight polyol comprises about 75 to about 95 percent by weight of the polyol component.

Isocyanate-Functional Component

The isocyanate-reactive component is reacted with an isocyanate-functional component during formation of the polyurethane-based PSAs of the invention. The isocyanate-functional component may contain one isocyanate-functional material or mixtures thereof. Polyisocyanates, including derivatives thereof (e.g., ureas, biurets, allophanates, dimers and trimers of polyisocyanates, and mixtures thereof), (hereinafter collectively referred to as "polyisocyanates") are the preferred isocyanate-functional materials for the isocyanate-functional component. Polyisocyanates have at least two isocyanate-functional groups and provide urethane linkages when reacted with the preferred hydroxy-functional isocyanate-reactive components.

Generally, diisocyanates are the preferred polyisocyanates. Particularly preferred diisocyanates useful in the present invention can be generally represented by Formula II:

(II)

wherein Z represents any suitable polyvalent radical, which may be, for example, polymeric or oligomeric. For example, Z can be based on arylene (e.g., phenylene), aralkylene, alkylene, cycloalkylene, polysiloxane (e.g., polydimethyl siloxane), or polyoxyalkylene (e.g., polyoxyethylene, polyoxypropylene, and polyoxytetramethylene) segments and mixtures thereof Preferably Z has about 1 to about 20 carbon atoms, and more preferably about 6 to about 20 carbon atoms.

For example, Z can be selected from 2,6-tolylene; 2,4-tolylene; 4,4'-methylenediphenylene; 3,3'-dimethoxy-4,4'-biphenylene; tetramethyl-m-xylylene; 4,4'-methylenedicyclohexylene; 3,5,5-trimethyl-3-methylenecyclohexylene; 1,6-hexamethylene; 1,4-cyclohexylene; 2,2,4-trimethylhexylene; or polymeric or oligomeric alkylene, aralkylene, or oxyalkylene radicals and mixtures thereof When Z is a polymeric or oligomeric material it may include, for example, urethane linkages.

The type of polyisocyanate used for the isocyanate-functional material may affect the properties of the PSA. For example, when symmetrical polyisocyanates are used, an increase in shear strength may be observed, as compared to using the same amount of a nonsymmetrical polyisocyanate.

However, any diisocyanate that can react with the isocyanate-reactive material can be used in the present invention. Examples of such diisocyanates include, but are not limited to, aromatic diisocyanates (e.g., 2,6-tolyene diisocyanate; 2,5-tolyene diisocyanate; 2,4-tolyene diisocyanate; m-phenylene diisocyanate; 5-chloro-2,4-tolyene diisocyanate; and 1-chloromethyl-2,4-diisocyanato benzene), aromatic-aliphatic diisocyanates (e.g., m-xylylene diisocyanate and tetramethyl-m-xylylene diisocyanate), aliphatic diisocyanates (e.g., 1,4-diisocyanatobutane; 1,6-diisocyanatohexane; 1,12-diisocyanatododecane; and 2-methyl-1,5-diisocyanatopentane), and cycloaliphatic diisocyanates (e.g., methylenedicyclohexylene-4,4'-diisocyanate; 3-isocyanatomethyl-3,5,5-trimethylcyclohexyl isocyanate (isophorone diisocyanate); 2,2,4-trimethylhexyl diisocyanate; and cyclohexylene-1,4-diisocyanate), and other compounds terminated by two isocyanate-functional groups (e.g., the diurethane of tolyene-2,4-diisocyanate-terminated polypropylene oxide polyol). Particularly preferred diisocyanates include: 2,6-tolyene diisocyanate; 2,4-tolyene diisocyanate; tetramethyl-m-xylylene diisocyanate; methylenedicyclohexylene-4,4'-diisocyanate; 3-isocyanatomethyl-3,5,5-trimethylcyclohexyl isocyanate (isophorone diisocyanate); 1,6-diisocyanatohexane; 2,2,4-trimethylhexyl diisocyanate; cyclohexylene-1,4-diisocyanate; methylenedicyclohexylene-4,4'-diisocyanate; and mixtures thereof More particularly preferred are 2,6-tolyene diisocyanate; 2,4-tolyene diisocyanate; tetramethyl-m-xylylene diisocyanate; 3-isocyanatomethyl-3,5,5-trimethylcyclohexyl isocyanate (isophorone diisocyanate); methylenedicyclohexylene-4,4'-diisocyanate; and mixtures thereof.

Although not as preferred as diisocyanates, other polyisocyanates may be used, for example, in combination with diisocyanates, for the polyisocyanate component. For example, triisocyanates may be used. Triisocyanates include, but are not limited to, polyfunctional isocyanates, such as those produced from biurets, isocyanurates, adducts, and the like. Some commercially available polyisocyanates include portions of the DESMODUR and MONDUR series from Bayer Corporation; Pittsburgh, Pa., and the PAPI series from Dow Plastics, a business group of the Dow Chemical Company; Midland, Mich. Preferred triisocyanates include those available from Bayer Corporation under the trade designations DESMODUR N-3300 and MONDUR 489.

Reactive Emulsifying Compound

When preparing polyurethane-based dispersions of the invention, the isocyanate-reactive and isocyanate-functional components may optionally be reacted with at least one reactive emulsifying compound according to one embodiment of the invention. The reactive emulsifying compound contains at least one anionic-functional group, cationic-functional group, group that is capable of forming an anionic-functional group or cationic-functional group, or mixtures thereof. This compound acts as an internal emulsifier because it contains at least one ionizable group. Thus, these compounds will hereinafter be referred to as "reactive emulsifying compounds."

Reactive emulsifying compounds are capable of reacting with at least one of the isocyanate-reactive and isocyanate-functional components to become incorporated into the polyurethane prepolymers. Thus, the reactive emulsifying compound contains at least one, preferably at least two, isocyanate- or active hydrogen-reactive (e.g., hydroxy-reactive) groups. Isocyanate- and hydroxy-reactive groups include, for example, isocyanate, hydroxyl, mercapto, and amine groups.

Preferably, the reactive emulsifying compound contains at least one anionic-functional group or group that is capable of forming such a group (i.e., an anion-forming group) when reacted with the isocyanate-reactive (e.g., polyol) and isocyanate-functional (e.g., polyisocyanate) components. The anionic-functional or anion-forming groups of the reactive emulsifying compound can be any suitable groups that contribute to ionization of the reactive emulsifying compound. For example, suitable groups include carboxylate, sulfate, sulfonate, phosphate, and similar groups.

The incorporation of a reactive emulsifying compound in the polyurethane prepolymer increases water dispersibility of the polyurethane prepolymer. Thus, dispersions prepared from such polyurethane prepolymers have improved dispersion stability as compared to many conventional dispersions. Furthermore, such dispersions may not require external emulsifiers, such as surfactants, for stability.

Preferably, a sufficient amount of reactive emulsifying compound is reacted such that an external emulsifier is not necessary for preparing a storage-stable dispersion. When a sufficient amount of the reactive emulsifying compound is used, the polyurethane prepolymers derived therefrom are also able to be dispersed into finer particles using less shear force than what has previously been possible with many conventional dispersions. A sufficient amount is generally such that the resulting polyurethane-based polymer comprises about 0.5 to about 5 weight percent, more preferably about 0.75 to about 3 weight percent, of segments derived from the reactive emulsifying compound. Below this amount, polyurethanes produced therefrom may be difficult to disperse, and dispersions produced therefrom may be unstable (i.e., subject to de-emulsification and/or coagulation at temperatures above room temperature, or at temperatures greater than about 20° C.). However, if polyols containing polyethylene oxide are used, the amount of reactive emulsifying compound used in this preferred embodiment may be less to form a stable dispersion. On the other hand, employing more reactive emulsifying compound in the reaction may produce an unstable dispersion or a resulting PSA that is too sensitive to moisture (i.e., such that physical properties of the PSA are affected to the degree that they are no longer consistently useful for their desired application).

The preferred structure for reactive emulsifying compounds of the invention is generally represented by Formula III:

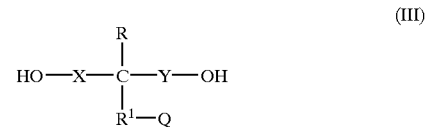

wherein Q is a negatively charged moiety selected from COO⁻ and SO₃⁻, or a group that is capable of forming such a negatively charge moiety upon ionization. Each of X Y, R, and R¹ may be the same or different. X, Y, R, and R¹ are independently selected from aliphatic organic radicals free of reactive functional groups (e.g., alkylene groups that are free of reactive functional groups), preferably having from about 1 to about 20 carbon atoms, and combinations thereof, with the provisos that: (i.) R can be hydrogen; and (ii.) R¹ is not required if Q is COO⁻.

As an example, dimethylolpropionic acid (DMPA) is a useful reactive emulsifying compound for this embodiment of the invention. Furthermore, 2,2-dimethylolbutyric acid, dihydroxymaleic acid, and sulfopolyester diol are other useful reactive emulsifying compounds. Those of ordinary skill in the art will recognize that a wide variety of reactive emulsifying compounds are useful in the present invention.

Polyurethane-Based Polymer Preparation

In general, the isocyanate-reactive and isocyanate-functional components, along with the optional reactive emulsifying compound, are allowed to react, forming an isocyanate-terminated polyurethane prepolymer (i.e., a polymer having a weight average molecular weight of less than about 50,000). In general, the isocyanate-functional group to isocyanate-reactive group ratio of the reactants is preferably about 1.1 to about 2.5, most typically about 1.5. If the isocyanate-functional group to isocyanate-reactive group ratio is lower than in this preferred range, prepolymer viscosity may be too high to be useful for forming dispersions according to one aspect of the invention.

The isocyanate-terminated polyurethane prepolymer is then chain extended with a chain extending agent (e.g., water (including ambient moisture), a polyamine, a relatively low molecular weight polyol (i.e., a polyol having a weight average molecular weight of less than about 250) and combinations thereof) to increase its molecular weight. When preparing the polymer in a 100% solids system, to chain extend the polyurethane prepolymer, generally the polyurethane prepolymer is first heated to decrease its viscosity.

When preparing the polymer in a waterborne or solvent-borne system, to chain extend the isocyanate-terminated polyurethane prepolymer, generally the polyurethane prepolymer is first introduced into a dispersing or solvating medium (e.g., water or an organic solvent such as N-methylpyrolidone, acetone, methyl ethyl ketone (MEK), or combinations thereof). The addition of organic solvents in a waterborne system may also help in reducing the viscosity of the prepolymer, which facilitates formation of the dispersion.

In waterborne systems, typically a neutralizing agent is also added to the polyurethane prepolymer to more easily disperse the polyurethane prepolymer in the dispersing medium. For example, a base, such as a tertiary amine or alkali metal salt, can be used as a neutralizing agent to neutralize any anion-forming groups in the polymeric chain and more easily disperse the polyurethane prepolymer in the dispersing medium. Generally, when neutralizing the polyurethane prepolymer before introducing it into the dispersing medium, a tertiary amine is used for the neutralizing agent. When neutralization occurs after introducing the polyurethane prepolymer into the dispersing medium, a tertiary amine, an alkali metal salt, or a combination thereof is used as the neutralizing agent.

In a waterborne system, the polyurethane prepolymer is then chain extended through the reaction of the isocyanate-functional groups in combination with water, at least one polyamine, or mixtures thereof. Isocyanate-functional groups react with water to form an unstable carbamic acid. The carbamic acid then converts to a primary amine and carbon dioxide. The primary amine forms a urea linkage with any remaining isocyanate-functional groups of the polyurethane prepolymer. When the chain extending agent comprises a polyamine, the polyamine forms urea linkages with the isocyanate-functional groups of the polyurethane prepolymer. Thus, the resulting polyurethane-based polymer contains both urethane and urea linkages therein.

As recognizable to those of ordinary skill in the art, the polyurethane prepolymer may alternatively be chain extended using other suitable chain extenders, which may be selected according to whether the polymer is formed using a 100% solids, solventborne, or waterborne system.

When the chain extending agent comprises a polyamine, any suitable compound having at least two amine functional groups can be used for the polyamine. For example, the compound may be a diamine, triamine, etc. Mixtures of polyamines may also be used for the chain extending agent. In general, the isocyanate-functional group to amine-functional group ratio of the reactants is preferably about 0.1 to about 1.5, most typically about 1.

Examples of polyamines useful in the present invention include, but are not limited to, polyoxyalkylene polyamines, alkylene polyamines, and polysiloxane polyamines. Preferably, the polyamine is a diamine.

The polyoxyalkylene polyamine may be, for example, a polyoxyethylene polyamine, polyoxypropylene polyamine, polyoxytetramethylene polyamine, or mixtures thereof. Polyoxyethylene polyamine may be especially useful when preparing the PSA for medical applications, for example, where a high vapor transfer medium and/or water absorbency may be desirable.

Many polyoxyalkylene polyamines are commercially available. For example, polyoxyalkylene diamines are available under trade designations such as D-230, D-400, D-2000, D-4000, DU-700, ED-2001 and EDR-148 (available from Huntsman Corporation; Houston, Tex., under the family trade designation JEFFAMINE). Polyoxyalkylene triamines are available under trade designations such as T-3000 and T-5000 (available from Huntsman Corporation; Houston, Tex.).

Alkylene polyamines include, for example, ethylene diamine; diethylene triamine; triethylene tetramine; propylene diamine; butylene diamine; hexamethylene diamine; cyclohexylene diamine; piperazine; 2-methyl piperazine; phenylene diamine; tolylene diamine; xylylene diamine; tris(2-aminoethyl) amine; 3,3'-dinitrobenzidine; 4,4'-methylenebis(2-chloroaniline); 3,3'-dichloro-4,4'-biphenyl diamine; 2,6-diaminopyridine; 4,4'-diaminodiphenylmethane; menthane diamine; m-xylene diamine; isophorone diamine; and dipiperidyl propane. Many alkylene polyamines are also commercially available. For example, alkylene diamines are available under trade designations such as DYTEK A and DYTEK EP (available from DuPont Chemical Company; Wilmington, Del.).

The polyurethane-based polymer may then be compounded with other materials to form a PSA having the desired properties. That is, PSAs of the present invention may contain various additives and other property modifiers.

For example, fillers, such as fumed silica, fibers (e.g., glass, metal, inorganic, or organic fibers), carbon black, glass or ceramic beadslbubbles, particles (e.g., metal, inorganic, or organic particles), polyamides (e.g., those available from DuPont Chemical Company; Wilmington, Del. under the trade designation, KEVLAR), and the like can be added, generally in amounts up to about 50 parts per hundred parts by weight of the polyurethane-based polymer, provided that such additives are not detrimental to the properties desired in the final PSA composition.

Other additives such as dyes, inert fluids (e.g., hydrocarbon oils), plasticizers, tackifiers, pigments, flame retardants, stabilizers, antioxidants, compatibilizers, antimicrobial agents (e.g., zinc oxide), electrical conductors, thermal conductors (e.g., aluminum oxide, boron nitride, aluminum nitride, and nickel particles), and the like can be blended into these compositions, generally in amounts of from about 1 to about 50 percent by total volume of the composition. It should be noted that, although tackifiers and plasticizers may be added, such additives are not necessary for obtaining PSA properties in polyurethane-based adhesives of the invention.

Application

When the polyurethane-based PSA is prepared from a solventbome or waterborne system, once the solution or dispersion is formed, it is easily applied to a substrate and then dried to form a PSA coating. Drying can be carried out either at room temperature (i.e., about 20° C.) or at elevated temperatures (e.g., about 25° C. to about 150° C.). Drying can optionally include using forced air or a vacuum. This includes the drying of static-coated substrates in ovens, such as forced air and vacuum ovens, or drying of coated substrates that are continuously conveyed through chambers heated by forced air, high-intensity lamps, and the like. Drying may also be performed at reduced (i.e., less than ambient) pressure.

A PSA coating can be formed on a wide variety of substrates. For example, the PSA can be applied to sheeting products (e.g., decorative, reflective, and graphical), labelstock, and tape backings. The substrate can be any suitable type of material depending on the desired application. Typically, the substrate comprises a nonwoven, paper, polymeric film (e.g., polypropylene (e.g., biaxially oriented polypropylene (BOPP)), polyethylene, polyurea, polyurethane, or polyester (e.g., polyethylene terephthalate)), or release liner (e.g., siliconized liner).

PSAs according to the present invention can be utilized to form tape, for example. To form a tape, a PSA coating is formed on at least a portion of a suitable backing. A release material (e.g., low adhesion backsize) can be applied to the opposite side of the backing, if desired. When double-sided tapes are formed, a PSA coating is formed on at least a portion of both sides of the backing.

EXAMPLES

These examples are merely for illustrative purposes only and are not meant to be limiting on the scope of the appended claims. All parts, percentages, ratios, etc. in the examples and the rest of the specification are by weight, unless noted otherwise. Furthermore, molecular weights in the examples and the rest of the specification are weight average molecular weights, unless noted otherwise.

The preparation methods and test methods described below were used to characterize polyurethane-based PSA compositions produced in the following examples. Although the examples focus on PSAs prepared from dispersions, as noted earlier, PSAs of the invention may also be prepared from 100% solids and solventborne systems. PSAs prepared from 100% solids and solventborne systems also benefit from the use of chemistries described herein.

Preparation of Pressure-Sensitive Adhesive (PSA) Tapes

The polyurethane-urea dispersion to be tested was cast onto a polyethylene terephthalate backing at a dry thickness of approximately 25 micrometers using a MEYER rod or a knife coater depending on the viscosity of the dispersion. The coating was allowed to dry at room temperature followed by further drying for 10 minutes in a 70° C. oven. The samples were placed in a constant temperature and humidity room (22° C. and 50% relative humidity) overnight prior to testing.

180° Peel Adhesion

This peel adhesion test is similar to the test method described in ASTM D 3330-90, substituting a glass substrate for the stainless steel substrate described in the test (for the present purpose, also referred to as "glass substrate peel adhesion test"). PSA tapes, prepared as described above, were cut into 1.27-centimeter by 15-centimeter strips. Each strip was then adhered to a 10 centimeter by 20 centimeter clean, solvent-washed glass coupon by passing a 2-kilogram roller once over the strip. The bonded assembly dwelled at room temperature for about one minute.

Each sample so prepared was tested for 180° peel adhesion using an IMASS slip/peel tester (Model 3M90, commercially available from Instrumentors Inc.; Strongsville, Ohio) at a rate of 2.3 meters/minute (90 inches/minute) using a five second data collection time. Two samples of each composition were tested. The reported peel adhesion value is an average of the peel adhesion value from each of the two samples.

Shear Strength

This shear strength test is similar to the test method described in ASTM D 3654-88. PSA tapes, prepared as described above, were cut into 1.27-centimeter by 15-centimeter strips. Each strip was then adhered to a stainless steel panel such that a 1.27-centimeter by 1.27-centimeter portion of each strip was in firm contact with the panel and one end portion of the strip hung free.

The panel with the attached strip was placed in a rack such that the panel formed an angle of 178° with the extended free end of the strip. The strip was tensioned by application of a force of one kilogram applied as a hanging weight from the free end of the strip. The 2° less than 180° was used to negate any peel forces, thus ensuring that only shear strength forces were measured, in an attempt to more accurately determine the holding power of the tape being tested.

The elapsed time for each tape sample to separate from the test panel was recorded as the shear strength. Each test was terminated at 10,000 minutes, unless the adhesive failed at an earlier time (as noted). All shear strength failures (if the adhesive failed at less than 10,000 minutes) reported herein were cohesive failures of the adhesive.

Table of Abbreviations

In the following table, the measured weight % of monol for certain of the higher molecular weight polyols was determined using proton-NMR spectroscopy. The weight % monol measured was the proportion of allyl protons with respect to the total number of protons in the polymer backbone of the polyol.

| Abbreviation or Trade Designation | Description |
|---|---|
| ACC-LAIM 3201 | A highly pure polypropylene oxide/polyethylene oxide diol with an approximate molecular weight of 3,000 grams/mole, an OH equivalent weight of approximately 1,500 grams/mole, and a measured weight % monol of 0.5, commercially available from Lyondell Chemical Company; Houston, Texas |
| ACC-LAIM 3205 | A highly pure polypropylene oxide/polyethylene oxide diol with an approximate molecular weight of 3,000 grams/mole, an OH equivalent weight of approximately 1,500 grams/mole, and a measured weight % monol of 0.2, commercially available from Lyondell Chemical Company; Houston, Texas |
| ACC-LAIM 4200 | A highly pure polypropylene oxide diol with an approximate molecular weight of 4,000 grams/mole, an OH equivalent weight of approximately 2,000 grams/mole, and a measured weight % monol of 0.6, commercially available from Lyondell Chemical Company; Houston, Texas |
| ACC-LAIM 6300 | A highly pure polypropylene oxide triol with an approximate molecular weight of 6,000 grams/mole and an OH equivalent weight of approximately 2,000 grams/mole, commercially available from Lyondell Chemical Company; Houston, Texas |
| ACC-LAIM 6320 | A highly pure polypropylene oxide/polyethylene oxide triol with an approximate molecular weight of 6,000 grams/mole, an OH equivalent weight of approximately 2,000 grams/mole, and a measured weight % monol of 1.1, commercially available from Lyondell Chemical Company; Houston, Texas |
| ACC-LAIM 12200 | A highly pure polypropylene oxide diol with an approximate molecular weight of 12,000 grams/mole, an OH equivalent weight of approximately 6,000 grams/mole, and a measured weight % monol of 3.8, commercially available from Lyondell Chemical Company; Houston, Texas |
| ARCOL PPG-425 | A polypropylene oxide diol with an approximate molecular weight of 425 grams/mole and an OH equivalent weight of approximately 200 grams/mole, commercially available from Lyondell Chemical Company; Houston, Texas |
| ARCOL PPG-4025 | A polypropylene oxide diol with an approximate molecular weight of 4,000 grams/mole, an OH equivalent weight of approximately 2,000 grams/mole, and a measured weight % monol. of 13.5, commercially available from Lyondell Chemical Company; Houston, Texas |
| ARCOL R-2585 | An experimental, highly pure polypropylene oxide/polyethylene oxide diol with an approximate molecular weight of 8,000 grams/mole, an OH equivalent weight of approximately 4,000 grams/mole, and a measured weight % monol of 2.2, from Lyondell Chemical Company; Houston, Texas |
| 1,4-BDO | 1,4-butanediol with an approximate molecular weight of 90 grams/mole, commercially available from Aldrich Chemical Company; Milwaukee, Wisconsin |
| DEG | Diethylene glycol with a molecular weight of approximately 100 grams/mole, commercially available from Aldrich Chemical Company; Milwaukee, Wisconsin |
| DES-W | A bis(4-isocyanato cyclohexyl) methane, commercially available from Bayer Corporation; Pittsburgh, Pennsylvania |
| DMPA | 2,2-dimethylolpropionic acid, commercially available from Aldrich Chemical Company; Milwaukee, Wisconsin |
| DPG | Dipropylene glycol with a molecular weight of approximately 130 grams/mole, commercially available from Aldrich Chemical Company; Milwaukee, Wisconsin |
| EDA | Ethylene diamine, commercially available from Aldrich Chemical Company; Milwaukee, Wisconsin |
| FASCAT 4224 | A reactive urethane catalyst, dibutyltin di-1-thioglycerol, with an OH equivalent weight of approximately 110 grams/mole commercially available from Elf Atochem North America, Inc.; Philadelphia, Pennsylvania |
| HFTC | A hydroxy-functional tin catalyst, dibutyltin-(1-mercaptoethanol)(1-thioglycerol), with an OH equivalent weight of approximately 150 grams/mole, prepared as described in the paragraph below this table |

-continued

| Abbreviation or Trade Designation | Description |
|---|---|
| IPDI | Isophorone diisocyanate, commercially available from Aldrich Chemical Company; Milwaukee, Wisconsin |
| JEFF-AMINE D-230 | A polyoxypropylenediamine with an approximate molecular weight of 230 grams/mole, commercially available from Huntsman Corporation; Houston, Texas |
| JEFF-AMINE D-2000 | A polyoxypropylenediamine with an approximate molecular weight of 2,000 grams/mole, commercially available from Huntsman Corporation; Houston, Texas |
| MEK | 2-butanone (methyl ethyl ketone), commercially available from Aldrich Chemical Company; Milwaukee, Wisconsin |
| 2-M-1,3-PDO | 2-methyl-1,3-propanediol with an approximate molecular weight of 90 grams/mole, commercially available from Aldrich Chemical Company; Milwaukee, Wisconsin |
| NIREZ 2019 | A terpene phenolic resin, commercially available from Arizona Chemical; Jacksonville, Florida |
| NMP | 1-methyl-2-pyrrolidinone, commercially available from Aldrich Chemical Company; Milwaukee, Wisconsin |
| 1,5-PDO | 1,5-pentanediol with an approximate molecular weight of 104 grams/mole, commercially available from Aldrich Chemical Company; Milwaukee, Wisconsin |
| PET | An aminated-polybutadiene primed polyester film of polyethylene terephthalate having a thickness of 38 micrometers |
| PHR | Parts per 100 parts polyurethane-based polymer |
| POLYG 85-29 | A polypropylene oxide/polyethylene oxide triol with an approximate molecular weight of 6,000 grams/mole and a measured weight % monol of 14.2, commercially available from Arch Chemicals, Inc.; Norwalk, CT |
| POLYG 85-36 | A polypropylene oxide/polyethylene oxide triol with an approximate molecular weight of 4,500 grams/mole, commercially available from Arch Chemicals, Inc.; Norwalk, CT |
| POLYG 83-26 | A polypropylene oxide/polyethylene oxide triol with an approximate molecular weight of 6,000 grams/mole and a measured weight % monol of 17.7, commercially available from Arch Chemicals, Inc.; Norwalk, CT |
| SA | Succinic anhydride (97% pure), commercially available from Aldrich Chemical Company; Milwaukee, Wisconsin |
| SBAA | 2-sulfobenzoic acid cyclic anhydride, commercially available from Aldrich Chemical Company; Milwaukee, Wisconsin |
| SPD | A sulfopolyester diol with an OH equivalent weight of 340 grams/mole and an approximate molecular weight of 680 grams/mole, prepared from dimethyl 5-sodiosulfoisophthalate, diethylene glycol and caprolactone as described in PCT Publication Number WO 99/15,572, Example 36 |
| T-12 | A dibutyl tin dilaurate catalyst, commercially available from Air Products and Chemicals, Inc.; Allentown, Pennsylvania |
| TDI | A tolylene 2,4-diisocyanate, tolylene 2,6-diisocyanate mixture, with a ratio of the two components of 80:20 parts by weight, and commercially available from Aldrich Chemical Company; Milwaukee, Wisconsin |
| ThA | Triethylamine, commercially available from Aldrich Chemical Company; Milwaukee, Wisconsin |
| VORANOL 232-028 | A polypropyleneoxide/polyethylene oxide triol having an approximate molecular weight of 6,000 grams/mole and a measured weight % monol of 6.5, commercially available from Dow Chemical Company; Midland, MI |

Hydroxy-Functional Tin Catalyst (HFTC) Preparation

In a round bottom flask fitted with a reflux condenser, a DEAN-STARK-type water trap, and a thermometer, 19.65 grams (0.181 moles) of thioglycerol (commercially available from Aldrich Chemical Company of Milwaukee, Wis.), 14.19 grams (0.181 moles) of mercaptoethanol (commercially available from Aldrich Chemical Company of Milwaukee, Wis.), 45.16 grams (0.181 moles) of dibutyl tin oxide (commercially available from Aldrich Chemical Company of Milwaukee, Wis.), and 200 milliliters of tolylene were placed. The mixture was magnetically stirred and heated to achieve reflux. Heating was continued until the theoretical yield of water was collected in the DEAN-STARK-type water trap. The flask was cooled to room temperature and the tolylene was removed under reduced pressure. The yield was 74.68 grams (98.6% of theoretical) of a clear, viscous liquid.

Example 1

Part I: Prepolymer Preparation

The polyols, ACCLAIM 3201 and ARCOL PPG-425, were dehydrated in-vacuo at 90° C.–100° C. overnight and cooled to room temperature before use. In a glass reaction vessel, 120.46 parts by weight of ACCLAIM 3201, 6.34 parts by weight of ARCOL PPG-425, 66.20 parts by weight of MEK, 2.83 parts by weight of DMPA and 24.97 parts by weight of IPDI were combined. The sealed glass reaction vessel was rotated in a thermostated temperature bath at 80° C. for 48 hours followed by being placed in a 70° C. oven for 4 hours.

Part II: Dispersion Preparation

First, 212.00 parts by weight of the prepolymer prepared in Part I and 2.05 parts by weight of TEA were combined and mixed for four hours. A premix solution of 2.16 parts by weight of EDA and 285 parts by weight distilled water was then prepared. The prepolymer/TEA mixture was dispersed in the water/EDA premix solution using a MICROFLUIDICS HOMOGENIZER Model # HC-5000 (commercially available from Microfluidics Corp.; Newton, Mass.) at a line air pressure of 0.621 MPa.

Part III: Tape Preparation

The dispersion prepared in Part II was used to prepare a tape sample as described above. The 180° Peel Adhesion and Shear Strength of the tape sample were tested as described above and are reported in Table 3. Additionally, the test results for Example 2 are reported in Table 24 for comparison purposes.

Examples 2–3

Part I: Prepolymer Preparation

The same procedure described in Example 1, Part I was followed, except using the reagents shown in Table 1.

TABLE 1

| Example | IPDI (parts by weight) | ACCLAIM 3201 (parts by weight) | ARCOL PPG-425 (parts by weight) | DMPA (parts by weight) | MEK (parts by weight) |
|---|---|---|---|---|---|
| 2 | 29.47 | 114.21 | 12.69 | 2.92 | 68.20 |
| 3 | 38.40 | 101.48 | 25.37 | 3.09 | 72.10 |

Part II: Dispersion Preparation

The same procedure described in Example 1, Part II was followed, except using the reagents and amounts shown in Table 2.

TABLE 2

| Example | Prepolymer from Part I (parts by weight) | TEA (parts by weight) | EDA (parts by weight) | Water (parts by weight) |
|---|---|---|---|---|
| 2 | 214.00 | 2.08 | 2.49 | 288 |
| 3 | 214.00 | 2.08 | 3.08 | 290 |

Part III: Tape Preparation

The dispersions prepared in Part II were used to prepare tape samples as described above. The 180° Peel Adhesion and Shear Strength of each tape sample were tested as described above and are reported in Table 3.

Example 4
Part I: Prepolymer Preparation

The polyol, ACCLAIM 3201, was dehydrated in-vacuo at 90° C.–100° C. overnight and cooled to room temperature prior to use. In a glass reaction vessel, 126.86 parts by weight of ACCLAIM 3201 and 50.30 parts by weight anhydrous MEK were combined and mixed until homogeneous (about five minutes). In a separate vessel, 2.75 parts by weight DMPA and 14.00 parts by weight NMP were combined and mixed until the DMPA was dissolved (about fifteen minutes). The DMPA/NMP solution was combined with the polyol/MEK solution. The resulting mixture was mixed until homogeneous (about five minutes). Then, 20.53 parts by weight of IPDI was added and the resulting mixture was mixed until homogeneous (about five minutes). The sealed glass reaction vessel was rotated in a thermostated temperature bath at 80° C. for 44 hours, followed by being placed in a 70° C. oven for 24 hours.

Part II: Dispersion Preparation

The same procedure described in Example 1, Part II was followed, except using 209.19 parts by weight of the prepolymer prepared in Part , 3.81 parts by weight of TEA, and a premix containing 1.80 parts by weight of EDA and 278 parts by weight of distilled water.

Part III: Tape Preparation

The dispersion prepared in Part II was used to prepare a tape sample as described above. The peel and shear properties of the tape sample were tested as described above and are reported in Table 3. Additionally, the test results for Example 4 are reported in Table 24 for comparison purposes.

TABLE 3

| Example | ACCLAIM 3201 (% by weight of total polyol) | ARCOL PPG-425 (% by weight of total polyol) | 180° Peel Adhesion (N/dm) | Shear Strength (minutes) |
|---|---|---|---|---|
| 1 | 95 | 5 | 65.0 | 568 |
| 2 | 90 | 10 | * | 1,538 |
| 3 | 80 | 20 | 58.2 | 10,000 |
| 4 | 100 | 0 | 80.3 | 94 |

*The adhesive separated from the backing. Therefore, the 180° Peel Adhesion test could not be run on Example 2.

Examples 5–7
Part I: Prepolymer Preparation

The same procedure described in Example 1, Part I was followed, except using the reagents shown in Table 4.

TABLE 4

| Example | ARCOL R-2585 (parts by weight) | ARCOL PPG-425 (parts by weight) | Acetone (parts by weight) | DMPA (parts by weight) | NMP (parts by weight) | IPDI (parts by weight) | HFTC (parts by weight) |
|---|---|---|---|---|---|---|---|
| 5 | 400.70 | 0 | 155.60 | 6.70 | 33.54 | 33.78 | 0.41 |
| 6 | 162.00 | 18.00 | 74.70 | 3.16 | 16.00 | 28.73 | 0.18 |
| 7 | 137.60 | 34.40 | 76.11 | 3.24 | 16.20 | 40.46 | 0.18 |

Part II: Dispersion Preparation

Example 5

A premix of 0.91 parts by weight of TEA, 1.08 parts by weight of EDA, and 301 parts by weight of distilled water was prepared. Then, 225.00 parts by weight of the prepolymer prepared in Part I was dispersed in the water/TEA/FDA premix in a MICROFLUIDICS HOMOGENIZER Model # HC-5000 (commercially available from Microfluidics Corp.; Newton, Mass.) at a line air pressure of 0.621 MPa.

Examples 6–7

The same procedure described in Example 1, Part II was followed, except using the reagents shown in Table 5.

TABLE 5

| Example | Prepolymer from Part I (parts by weight) | TEA (parts by weight) | EDA (parts by weight) | Water (parts by weight) |
|---|---|---|---|---|
| 6 | 220.00 | 1.50 | 1.88 | 295 |
| 7 | 220.00 | 1.20 | 2.60 | 295 |

Part III: Tape Preparation

The dispersions prepared in Part II were used to prepare tape samples as described above. The 180° Peel Adhesion and Shear Strength of each tape sample were tested as described above and are reported in Table 6. Additionally, the test results for Example 5 are reported in Table 24 and the test results for Examples 6 and 7 are reported in Table 13 for comparison purposes.

TABLE 6

| Example | ARCOL R-2585 (% by weight of total polyol) | ARCOL PPG-425 (% by weight of total polyol) | 180° Peel Adhesion (N/dm) | Shear Strength (minutes) |
|---|---|---|---|---|
| 5 | 100 | 0 | 68.3 | 507 |
| 6 | 90 | 10 | 73.7 | 2,237 |
| 7 | 80 | 20 | 69.8 | 5,441 |

Example 8
Part I: Prepolymer Preparation

Prior to use, the polyols, ACCLAIM 12200 and ARCOL PPG-425, were dehydrated in-vacuo at 90° C.–100° C. overnight and cooled to room temperature. In a glass reaction vessel, 96.32 parts by weight of ACCLAIM 12200, 24.08 parts by weight of ARCOL PPG-425, and 52.85 parts by weight of MEK were combined and mixed until homogeneous (about five minutes). In a separate vessel, 2.26 parts by weight of DMPA and 11.34 parts by weight of NMP were combined and mixed until the DMPA was dissolved (about fifteen minutes). The DMPA/NMP solution was combined with the polyol/MEK solution and mixed until homogeneous (about five minutes). Then, 27.52 parts by weight of IPDI and 0.13 gram of HFTC were added to the resulting mixture and mixed until homogeneous (about five minutes). The reaction vessel was rotated in a thermostated temperature bath at 80° C. for 22 hours and then in a 70° C. oven for four hours.

Part II: Dispersion Preparation

The same procedure described in Example 1, Part II was followed, except using 193.50 parts by weight of the prepolymer prepared in Part I, 1.55 parts by weight of TEA, and a premix containing 2.23 parts by weight of EDA and 262 parts by weight of distilled water.

Part III: Tape Preparation

The dispersion prepared in Part II was used to prepare a tape sample as described above. The 180° Peel Adhesion and Shear Strength of the tape sample were tested as described above and are reported in Table 7.

Example 9

Part I: Prepolymer Preparation

The polyol, ACCLAIM 12200, was dehydrated in-vacuo at 90° C.–100° C. overnight and cooled to room temperature prior to use. In a glass reaction vessel, 144.48 parts by weight of ACCLAIM 12200, 67.30 parts by weight of MEK, 2.36 parts by weight of DMPA, and 10.38 parts by weight of IPDI were combined. The reaction vessel was rotated in a thermostated temperature bath at 80° C. for 48 hours followed by being placed in a 70° C. oven for four hours.

Part II: Dispersion Preparation

The same procedure described in Example 1, Part II was followed, except using 201.00 parts by weight of the prepolymer prepared in Part I, 0.80 gram of TEA, and a premix containing 0.83 gram of EDA and 269 parts by weight of distilled water.

Part III: Tape Preparation

The dispersion prepared in Part II was used to prepare a tape sample as described above. The 180° Peel Adhesion and Shear Strength of the tape sample were tested as described above and are reported in Table 7.

TABLE 7

| Example | ACCLAIM 12200 (% by weight of total polyol) | ARCOL PPG-425 (% by weight of total polyol) | 180° Peel Adhesion (N/dm) | Shear Strength (minutes) |
| --- | --- | --- | --- | --- |
| 8 | 80 | 20 | 36.5 | 10,000 |
| 9 | 100 | 0 | 47.0 | 217 |

Example 10

Part I: Prepolymer Preparation

The polyol, ACCLAIM 3201, was dehydrated in-vacuo at 90° C.–100° C. overnight and cooled to room temperature before use. In a glass reaction vessel, 130.00 parts by weight of ACCLAIM 3201, 0.66 gram of 1,5-PDO, 1.43 parts by weight of DMPA, 65.10 parts by weight of anhydrous acetone, 19.91 parts by weight of IPDI, and 0.14 gram of FASCAT 4224 were combined. The reaction vessel was rotated in a thermostated temperature bath at 80° C. for sixteen hours followed by being placed in a 70° C. oven for one hour.

Part II: Dispersion Preparation

The same procedure described in Example 1, Part II was followed, except using 210.00 parts by weight of the prepolymer prepared in Part I, 1.05 parts by weight of TEA, and a premix containing 1.73 parts by weight of EDA and 283 parts by weight of distilled water.

Part III: Tape Preparation

The dispersion prepared in Part II was used to prepare a tape sample as described above. The 180° Peel Adhesion and Shear Strength of the tape sample were tested as described above and are reported in Table 10.

Examples 11–13

Part I: Prepolymer Preparation

The same procedure described in Example 10, Part I was followed with the reagents shown in Table 8.

TABLE 8

| Example | ACCLAIM 3201 (parts by weight) | 1,5-PDO (parts by weight) | Acetone (parts by weight) | DMPA (parts by weight) | IPDI (parts by weight) | FASCAT 4224 (parts by weight) |
| --- | --- | --- | --- | --- | --- | --- |
| 11 | 130.00 | 1.32 | 66.4 | 1.46 | 22.10 | 0.14 |
| 12 | 130.00 | 2.66 | 68.70 | 1.51 | 26.31 | 0 |
| 13 | 130.00 | 6.85 | 76.50 | 1.68 | 40.17 | 0 |

Part II: Dispersion Preparation

The same procedure described in Example 4, Part II was followed with the reagents shown in Table 9.

TABLE 9

| Example | Prepolymer from Part I (parts by weight) | TEA (parts by weight) | EDA (parts by weight) | Water (parts by weight) |
| --- | --- | --- | --- | --- |
| 11 | 215.00 | 1.07 | 1.93 | 290 |
| 12 | 220.00 | 1.10 | 2.27 | 297 |
| 13 | 220.00 | 1.10 | 3.12 | 299 |

Part III: Tape Preparation

The dispersions prepared in Part II were used to prepare tape samples as described above. The 180° Peel Adhesion and Shear Strength of each tape sample were tested as described above and are reported in Table 10.

TABLE 10

| Example | ACCLAIM 3201 (% by weight of total polyol | 1,5-PDO (% by weight of total polyol) | 180° Peel Adhesion (N/dm) | Shear Strength (minutes) |
| --- | --- | --- | --- | --- |
| 10 | 99.5 | 0.5 | 78.8 | 3 |
| 11 | 99 | 1 | 78.5 | 29 |
| 12 | 98 | 2 | 44.6 | 95 |
| 13 | 95 | 5 | 11.8 | 10,000 |

Example 14

Part I: Prepolymer Preparation

The polyol, ACCLAIM 3201, was dehydrated in-vacuo at 90° C.–100° C. overnight and cooled to room temperature before use. In a glass reaction vessel, 130.00 parts by weight of ACCLAIM 3201, 1.32 parts by weight of 1,5-PDO, 2.88 parts by weight of DMPA, 68.40 parts by weight of anhydrous acetone and 25.42 parts by weight of IPDI were combined. The reaction vessel was rotated in a thermostated temperature bath at 80° C. for 48 hours followed by being placed in a 70° C. oven for one hour. ACCLAIM 3201 comprised 99% by weight of the polyol. The other 1% by weight of the polyol comprised a short chain diol, as indicated in Table 11.

Part II: Dispersion Preparation

The same procedure described in Example 4, Part II was followed, except that 215.00 parts by weight of the prepolymer prepared in Part I, 2.05 parts by weight of TEA, 2.16 parts by weight of EDA, and 287 parts by weight of water were used.

Part III: Tape Preparation

The dispersion prepared in Part II was used to prepare a tape sample as described above. The 180° Peel Adhesion and Shear Strength of the tape sample were tested as described above and are reported in Table 11.

Example 15

Part I: Prepolymer Preparation

The polyol, ACCLAIM 3201, was dehydrated in-vacuo at 90° C.–100° C. overnight and cooled to room temperature before use. In a glass reaction vessel, 130.00 parts by weight of ACCLAIM 3201, 1.32 parts by weight of 1,4-BDO, 2.89 parts by weight of DMPA, 68.60 parts by weight of anhydrous acetone and 26.11 parts by weight of IPDI were combined. The reaction vessel was rotated in a thermostated temperature bath at 80° C. for 46 hours followed by being placed in a 70° C. oven for one hour. ACCLAIM 3201 comprised 99% by weight of the polyol. The other 1% by weight of the polyol comprised a short chain diol, as indicated in Table 11.

Part II: Dispersion Preparation

The same procedure described in Example 4, Part II was followed, except that 215.00 parts by weight of the prepolymer prepared in Part I, 2.05 parts by weight of TEA, 2.21 parts by weight of EDA, and 288 parts by weight of water were used.

Part III: Tape Preparation

The dispersion prepared in Part II was used to prepare a tape sample as described above. The 180° Peel Adhesion and Shear Strength of the tape sample were tested as described above and are reported in Table 11.

Example 16

Part I: Prepolymer Preparation

The polyol, ACCLAIM 3201, was dehydrated in-vacuo at 90° C.–100° C. overnight and cooled to room temperature before use. In a glass reaction vessel, 130.00 parts by weight of ACCLAIM 3201, 1.32 parts by weight of 2-M-1,3-PDO, 2.89 parts by weight of DMPA, 68.60 parts by weight of anhydrous acetone, and 26.11 parts by weight of IPDI were combined. The reaction vessel was rotated in a thermostated temperature bath at 80° C. for 46 hours followed by being placed in a 70° C. oven for one hour. ACCLAIM 3201 comprised 99% by weight of the polyol. The other 1% by weight of the polyol comprised a short chain diol, as indicated in Table 11.

Part II: Dispersion Preparation

The same procedure described in Example 4, Part II was followed, except that 215.00 parts by weight of the prepolymer prepared in Part I, 2.05 parts by weight of TEA, 2.21 parts by weight of EDA, and 288 parts by weight of water were used.

Part III: Tape Preparation

The dispersion prepared in Part II was used to prepare a tape sample as described above. The 180° Peel Adhesion and Shear Strength of the tape sample were tested as described above and are reported in Table 11.

Example 17

Part I: Prepolymer Preparation

The polyol, ACCLAIM 3201, was dehydrated in-vacuo at 90° C.–100° C. overnight and cooled to room temperature before use. In a glass reaction vessel, 130.00 parts by weight of ACCLAIM 3201, 1.32 parts by weight of DEG, 2.88 parts by weight of DMPA, 68.30 parts by weight of anhydrous acetone, and 25.34 parts by weight of IPDI were combined. The reaction vessel was rotated in a thermostated temperature bath at 80° C. for 46 hours followed by being placed in a 70° C. oven for one hour. ACCLAIM 3201 comprised 99% by weight of the polyol. The other 1% by weight of the polyol comprised a short chain diol, as indicated in Table 11.

Part II: Dispersion Preparation

The same procedure described in Example 4, Part II was followed, except that 215.00 parts by weight of the prepolymer prepared in Part I, 2.05 parts by weight of TEA, 2.15 parts by weight of EDA, and 288 parts by weight of water were used.

Part III: Tape Preparation

The dispersion prepared in Part II was used to prepare a tape sample as described above. The 180° Peel Adhesion and Shear Strength of the tape sample were tested as described above and are reported in Table 11.

Example 18

Part I: Prepolymer Preparation

The polyol, ACCLAIM 3201, was dehydrated in-vacuo at 90° C.–100° C. overnight and cooled to room temperature before use. In a glass reaction vessel, 130.00 parts by weight of ACCLAIM 3201, 1.32 parts by weight of DPG, 2.87 parts by weight of DMPA, 67.90 parts by weight of anhydrous acetone, and 24.45 parts by weight of IPDI were combined. The reaction vessel was rotated in a thermostated temperature bath at 80° C. for 46 hours followed by being placed in a 70° C. oven for one hour. ACCLAIM 3201 comprised 99% by weight of the polyol. The other 1% by weight of the polyol comprised a short chain diol, as indicated in Table 11.

Part II: Dispersion Preparation

The same procedure described in Example 4, Part II was followed, except that 215.00 parts by weight of the prepolymer prepared in Part I 2.06 parts by weight of TEA, 2.09 parts by weight of EDA, and 288 parts by weight of water were used.

Part III: Tape Preparation

The dispersion prepared in Part II was used to prepare a tape sample as described above. The 180° Peel Adhesion and Shear Strength of the tape sample were tested as described above and are reported in Table 11.

TABLE 11

| Example | Short Chain Diol | 180° Peel Adhesion (N/dm) | Shear Strength (minutes) |
| --- | --- | --- | --- |
| 14 | 1,5-PDO | 45.7 | 125 |
| 15 | 1,4-BDO | 28.7 | 530 |
| 16 | 2-M-1,3-PDO | 72.9 | 626 |
| 17 | DEG | 61.3 | 400 |
| 18 | DPG | 69.8 | 248 |

Examples 19–20

Part I: Prepolymer Preparation

The same procedure described in Example 1, Part I was followed, except using the reagents shown in Table 12.

TABLE 12

| Example | ARCOL R-2585 (parts by weight) | ARCOL PPG-425 (parts by weight) | Acetone (parts by weight) | DMPA (parts by weight) | NMP (parts by weight) | IPDI (parts by weight) | HFTC (parts by weight) |
|---|---|---|---|---|---|---|---|
| 19 | 137.60 | 34.40 | 80.00 | 2.12 | 10.62 | 37.68 | 0.18 |
| 20 | 127.77 | 31.94 | 62.28 | 5.68 | 27.90 | 44.75 | 0.33 |

Part II: Dispersion Preparation

Example 19

The same procedure described in Example 1, Part II was followed, except 220.00 parts by weight of the prepolymer from Part I, 2.00 parts by weight of TEA, 2.46 parts by weight of EDA, and 296 parts by weight of water were used.

Example 20

The same procedure described in Example 4, Part II was followed, except that 224.40 parts by weight of the prepolymer prepared in Part I, 1.60 parts by weight of TEA, of EDA, and 304 parts by weight of water were used.

Part III: Tape Preparation

The dispersions prepared in Part II were used to prepare tape samples as described above. The 180° Peel Adhesion and Shear Strength of each tape sample were tested as described above and are reported in Table 13.

Example 21

Part I: Prepolymer Preparation

The polyols, ARCOL R-2585 and ARCOL PPG-425, were dehydrated in-vacuo at 90° C.–100° C. overnight and cooled to room temperature prior to use. In a glass reaction vessel, 162.00 parts by weight of ARCOL R-2585, 18.00 parts by weight of ARCOL PPG-425, and 78.75 parts by weight of anhydrous acetone were combined and mixed until homogeneous (about five minutes). In a separate vessel, 2.09 parts by weight of DMPA and 10.40 parts by weight of NMP were combined and mixed until the DMPA was dissolved (about fifteen minutes). The DMPA/NMP solution was combined with the polyol/acetone solution and mixed until homogeneous (about five minutes). To this mixture was added, sequentially, 26.00 parts by weight of IPDI and 0.18 gram of HFTC. After each addition, the resulting mixture was mixed until homogeneous (about five minutes). The reaction mixture vessel was placed in an 80° C. oven for six hours and agitated intermittently.

Part II: Dispersion Preparation

The same procedure described in Example 1, Part II was followed, except that 220.00 parts by weight of the prepolymer prepared in Part I, 2.00 parts by weight of TEA, 1.73 parts by weight of EDA, and 295 parts by weight of water were used.

Part III: Tape Preparation

The dispersion prepared in Part II was used to prepare a tape sample as described above. The 180° Peel Adhesion and Shear Strength of the tape sample were tested as described above and are reported in Table 13.

TABLE 13

| Example | ARCOL R-2585 (% by weight of total polyol) | ARCOL PPG-425 (% by weight of total polyol) | DMPA (% by weight of pre-polymer) | 180° Peel Adhesion (N/dm) | Shear Strength (minutes) |
|---|---|---|---|---|---|
| 19 | 80 | 20 | 1.0 | 82.5 | 1,102 |
| 7 | 80 | 20 | 1.5 | 69.8 | 5,441 |
| 20 | 80 | 20 | 2.7 | 55.4 | 10,000 |
| 21 | 90 | 10 | 1.0 | 95.8 | 468 |
| 6 | 90 | 10 | 1.5 | 73.7 | 2,237 |

Example 22

Part I: Prepolymer Preparation

The polyol, ACCLAIM 3201, was dehydrated in-vacuo at 90° C.–100° C. overnight and cooled to room temperature before use. In a glass reaction vessel, 139.55 parts by weight of ACCLAIM 3201, 2.95 parts by weight of DMPA, 68.55 parts by weight of anhydrous acetone, and 17.55 parts by weight of TDI were combined. The reaction vessel was rotated in a thermostated temperature bath at 80° C. for seventeen hours being placed in an 80° C. oven for sixteen hours.

Part II: Dispersion Preparation

First, 220.00 parts by weight of the prepolymer prepared above and 2.15 parts by weight of TEA were combined and mixed for approximately fifteen minutes. The prepolymer/TEA mixture was then dispersed in 291 parts by weight of distilled water in a MICROFLUIDICS HOMOGENIZER Model # HC-5000 (commercially available from Microfluidics Corp.; Newton, Mass.) at an airline pressure of 0.621 MPa. The reaction mixture was stirred overnight at ambient temperature with a magnetic stir bar.

Part III: Tape Preparation

The dispersion prepared in Part II was used to prepare a tape sample as described above. The 180° Peel Adhesion and Shear Strength of the tape sample were tested as described above and are reported in Table 14. Additionally, the test results for Example 22 are reported in Table 24 for comparative purposes.

TABLE 14

| Example | ACCLAIM 3201 (% by weight of total polyol) | DMPA (% by weight of prepolymer) | 180° Peel Adhesion (N/dm) | Shear Strength (minutes) |
|---|---|---|---|---|
| 22 | 100 | 1.8 | 75.0 | 743 |

Examples 23–25

Part I: Prepolymer Preparation

The same procedure described in Example 1, Part I was followed, except using the reagents shown in Table 15.

TABLE 15

| Example | ARCOL R-2585 (parts by weight) | ARCOL PPG-425 (parts by weight) | Acetone (parts by weight) | DMPA (parts by weight) | NMP (parts by weight) | IPDI (parts by weight) | HFTC (parts by weight) |
|---|---|---|---|---|---|---|---|
| 23 | 363.04 | 19.12 | 134.00 | 12.00 | 60.00 | 60.52 | 0.78 |
| 24 | 363.04 | 19.12 | 134.00 | 12.00 | 60.00 | 60.52 | 0.78 |
| 25 | 181.52 | 9.56 | 67.00 | 6.00 | 30.00 | 30.26 | 0.39 |

Part II: Dispersion Preparation

Example 23

The same procedure described in Example 1, Part II was followed, except 160.00 parts by weight of the prepolymer prepared in Part I, 1.12 parts by weight of TEA, no EDA, and 212 parts by weight of water were used.

Example 24

The same general procedure described in Example 1, Part II was followed, except 160.00 parts by weight of the prepolymer prepared in Part I, 1.12 parts by weight of TEA, and a premix containing 0.67 gram of EDA, 2.68 parts by weight of JEFFAMINE D-230, and 214 parts by weight of distilled water were used.

Example 25

The same procedure described in Example 4, Part II was followed, except that 225.00 parts by weight of the prepolymer prepared in Part , 1.57 parts by weight of TEA, 1.88 parts by weight of EDA, and 303 parts by weight of water were used.

Part III: Tape Preparation

The dispersions prepared in Part II were used to prepare tape samples as described above. The 180° Peel Adhesion and Shear Strength of each tape sample were tested as described above and are reported in Table 16. Additionally, the results of Example 25 are reported in Table 18 for comparative purposes.

TABLE 16

| Example | ARCOL R-2585 (% by weight of total polyol) | ARCOL PPG-425 (% by weight of total polyol) | Chain Extender | 180° Peel Adhesion (N/dm) | Shear Strength (minutes) |
|---|---|---|---|---|---|
| 23 | 95 | 5 | water | 59.3 | 10,000 |
| 24 | 95 | 5 | EDA: JEFFAMINE D-230 (in a weight ratio of 50:50) | 63.7 | 10,000 |
| 25 | 95 | 5 | EDA | 49.9 | 10,000 |

Example 26

Part I: Prepolymer Preparation

The same procedure described in Example 1, Part I was followed, except using the reagents shown in Table 17.

TABLE 17

| Example | ARCOL R-2585 (parts by weight) | ARCOL PPG-425 (parts by weight) | Acetone (parts by weight) | DMPA (parts by weight) | NMP (parts by weight) | IPDI (parts by weight) | HFTC (parts by weight) |
|---|---|---|---|---|---|---|---|
| 26 | 181.52 | 9.56 | 67.00 | 6.00 | 30.00 | 29.82 | 0 |

Part II: Dispersion Preparation

The same procedure described in Example 4, Part II was followed, except that 225.00 parts by weight of the prepolymer prepared in Part I, 1.57 parts by weight of TEA, 1.86 parts by weight of EDA, and 303 parts by weight of water were used.

Part III: Tape Preparation

The dispersion prepared in Part II was used to prepare a tape sample as described above. The 180° Peel Adhesion and Shear Strength of the tape sample were tested as described above and are reported in Table 18.

TABLE 18

| Example | ARCOL R-2585 (% by weight of total polyol) | ARCOL PPG-425 (% by weight of total polyol) | Catalyst | 180° Peel Adhesion (N/dm) | Shear Strength (minutes) |
|---|---|---|---|---|---|
| 25 | 95 | 5 | HFTC | 49.9 | 10,000 |
| 26 | 95 | 5 | none | 47.7 | 10,000 |

Example 27 and Example 28

Part I: Prepolymer Preparation

The same procedure described in Example 1, Part I was followed, except using the reagents shown in Table 19 with the modification that ACCLAIM 3205 was used in place of ACCLAIM 3201. Furthermore, HFTC was also added to the reaction mixture for Example 27, as noted in Table 19.

TABLE 19

| Example | IPDI (parts by weight) | ACCLAIM 3205 (parts by weight) | ARCOL PPG-425 (parts by weight) | DMPA (parts by weight) | HFTC (parts by weight) | MEK (parts by weight) |
|---|---|---|---|---|---|---|
| 27 | 18.24 | 133.49 | 0 | 1.45 | 0.14 | 65.70 |
| 28 | 38.45 | 101.48 | 25.37 | 3.09 | 0 | 72.10 |

Part II: Dispersion Preparation

The same procedure described in Example 1, Part II was followed with the reagents shown in Table 20.

TABLE 20

| Example | Prepolymer from Part I (parts by weight) | TEA (parts by weight) | EDA (parts by weight) | Water (parts by weight) |
|---|---|---|---|---|
| 27 | 240.49 | 2.34 | 3.46 | 326 |
| 28 | 240.49 | 2.34 | 3.46 | 326 |

Part III: Tape Preparation

The dispersions prepared in Part II were used to prepare tape samples as described above. The 180° Peel Adhesion and Shear Strength of each tape sample were tested as described above and are reported in Table 21.

TABLE 21

| Example | ACCLAIM 3205 (% by weight of total polyol) | ARCOL PPG-425 (% by weight of total polyol) | 180° Peel Adhesion (N/dm) | Shear Strength (minutes) |
|---|---|---|---|---|
| 27 | 100 | 0 | 145.9 | 4 |
| 28 | 80 | 20 | 60.4 | 4,404 |

Example 29

Part I: Prepolymer Preparation

The polyols, ACCLAIM 3201 and SPD, were dehydrated in-vacuo at 90° C.–100° C. overnight and cooled to room temperature prior to use. In a glass reaction vessel, 90.00 parts by weight of ACCLAIM 3201, 90.00 parts by weight of SPD, 66.20 parts by weight of anhydrous acetone, and 20.00 parts by weight of NMP were combined and mixed until homogeneous (about five minutes). In a separate vessel, 2.09 parts by weight of DMPA and 10.40 parts by weight of NMP were combined and mixed until the DMPA was dissolved (about fifteen minutes). The DMPA/NMP solution was combined with the polyol/acetone solution and mixed until homogeneous (about five minutes). To this mixture was added, sequentially, 54.65 parts by weight of IPDI and 0.36 gram of HFTC. After each addition the resulting mixture was mixed until homogeneous (about five minutes). The reaction mixture vessel was placed in an 80° C. oven for six hours and agitated intermittently.

Part II: Dispersion Preparation

The same procedure described in Example 1, Part II was followed with 230.40 parts by weight of the prepolymer prepared in Part I and a premix containing 3.19 parts by weight of EDA and 285 parts by weight of distilled water.

Part III: Tape Preparation

The dispersion prepared in Part II was used to prepare a tape sample as described above. The 180° Peel Adhesion and Shear Strength of the tape sample were tested as described above and are reported in Table 22.

TABLE 22

| Example | ACCLAIM 3201 (% by weight of total polyol) | SPD (% by weight of total polyol) | 180° Peel Adhesion (N/dm) | Shear Strength (minutes) |
|---|---|---|---|---|
| 29 | 50 | 50 | 39.2 | 10,000 |

Example 30

Part I: Prepolymer Preparation

The polyols, ARCOL R-2585 and ACCLAIM 6320, were dehydrated in-vacuo at 90° C.–100° C. overnight and cooled to room temperature prior to use. In a glass reaction vessel, 171.68 parts by weight of ARCOL R-2585, 9.04 parts by weight of ACCLAIM 6320, and 61.74 parts by weight of anhydrous acetone were combined and mixed until homogeneous (about five minutes). In a separate vessel, 5.67 parts by weight of DMPA and 27.90 parts by weight of NMP were combined and mixed until the DMPA was dissolved (about fifteen minutes). The DMPA/NMP solution was combined with the polyol/acetone solution and mixed until homogeneous (about five minutes). To this mixture was added, sequentially, 22.66 parts by weight of IPDI and 0.19 gram of HFTC. After each addition the resulting mixture was mixed until homogeneous (about five minutes). The reaction mixture vessel was placed in an 80° C. oven for six hours and agitated intermittently.

Part II: Dispersion Preparation

The same procedure described in Example 1, Part II was followed, except using 224.20 parts by weight of the prepolymer prepared in Part I, 1.61 parts by weight of TEA, and a premix containing 1.02 parts by weight of EDA and 299 parts by weight of distilled water.

Part III: Tape Preparation

The dispersion prepared in Part II was used to prepare a tape sample as described above. The 180° Peel Adhesion and Shear Strength of the tape sample were tested as described above and are reported in Table 23.

TABLE 23

| Example | ARCOL R-2585 (% by weight of total polyol) | ACCLAIM 6320 (% by weight of total polyol) | 180° Peel Adhesion (N/dm) | Shear Strength (minutes) |
|---|---|---|---|---|
| 30 | 95 | 5 | 43.3 | 10,000 |

Example 31

Part I: Prepolymer Preparation

The polyol, ARCOL R-2585, was dehydrated in-vacuo at 90° C.–100° C. overnight and cooled to room temperature prior to use. In a glass reaction vessel, 188.25 parts by weight of ARCOL R-2585 and 74.00 parts by weight of anhydrous acetone were combined and mixed until homogeneous (about five minutes). In a separate vessel, 3.35 parts by weight of DMPA and 16.77 parts by weight of NMP were combined and mixed until the DMPA was dissolved (about fifteen minutes). The DMPA/NMP solution was combined with the polyol/acetone solution and mixed until homogeneous (about five minutes). To this mixture was added, sequentially, 20.04 parts by weight of DES-W and 0.19 gram of HFTC. After each addition, the resulting mixture was mixed until homogeneous (about five minutes). The reaction mixture vessel was placed in an 80° C. oven for six hours and agitated intermittently.

Part III: Dispersion Preparation

The same procedure described in Example 4, Part II was followed, except using 228.80 parts by weight of the prepolymer prepared in Part I and a premix containing 0.95 gram of TEA, 1.16 parts by weight of EDA, and 302 parts by weight of distilled water.

Part III: Tape Preparation

The dispersion prepared in Part II was used to prepare a tape sample as described above. The 180° Peel Adhesion and Shear Strength of the tape sample were tested as described above and are reported in Table 24.

Example 32

Part I: Prepolymer Preparation

The polyols, ACCLAIM 3201 and ARCOL PPG-425, were dehydrated in-vacuo at 90° C.–100° C. overnight and cooled to room temperature before use. In a glass reaction vessel, 120.46 parts by weight of ACCLAIM 3201, 6.34 parts by weight of ARCOL PPG-425, 2.68 parts by weight of DMPA, 63.70 parts by weight of anhydrous acetone, and 19.27 parts by weight of TDI were combined. The reaction vessel was rotated in a thermostated temperature bath at 80° C. for forty hours.

Part II: Dispersion Preparation

A premix solution of 1.91 parts by weight of TEA and 264 parts by weight of distilled water was prepared. Then, 200.00 parts by weight of the prepolymer prepared above was dispersed in the water/TEA mixture using a MICROFLUIDICS HOMOGENIZER Model # HC-5000 (commercially available from Microfluidics Corp.; Newton, Mass.) at an airline pressure of 0.621 MPa. The reaction mixture was stirred overnight at ambient temperature with a magnetic stir bar.

Part III: Tape Preparation

The dispersion prepared in Part II was used to prepare a tape sample as described above. The 180° Peel Adhesion and Shear Strength of the tape sample were tested as described above and are reported in Table 24.

TABLE 24

| Example | First Polyol (% of weight of total polyol) | Second Polyol (% by weight of total polyol) | Diisocyanate | 180° Peel Adhesion (N/dm) | Shear Strength (minutes) |
| --- | --- | --- | --- | --- | --- |
| 5 | ARCOL R-2585 (100) | (0) | IPDI | 68.3 | 507 |
| 31 | ARCOL R-2585 (100) | (0) | DES-W | 17.3 | 10,000 |
| 4 | ACCLAIM 3201 (100) | (0) | IPDI | 80.3 | 94 |

TABLE 24-continued

| Example | First Polyol (% of weight of total polyol) | Second Polyol (% by weight of total polyol) | Diisocyanate | 180° Peel Adhesion (N/dm) | Shear Strength (minutes) |
| --- | --- | --- | --- | --- | --- |
| 22 | ACCLAIM 3201 (100) | (0) | TDI | 75.0 | 743 |
|  | ACCLAIM 3201 (95) | ARCOL PPG-425 (5) | IPDI | 65.0 | 568 |
| 32 | ACCLAIM 3201 (95) | ARCOL PPG-425 (5) | TDI | 52.3 | 10,000 |

Example 33

Part I: Prepolymer Preparation

The polyols, ACCLAIM 4200 and ARCOL PPG-425, were dehydrated in-vacuo at 90° C.–100° C. overnight and cooled to room temperature before use. In a glass reaction vessel, 128.35 parts by weight of ACCLAIM 4200, 6.76 parts by weight of ARCOL PPG-425, 4.00 parts by weight of DMPA, 68.40 parts by weight of anhydrous acetone, and 20.61 parts by weight of TDI were combined. The reaction vessel was rotated in a thermostated temperature bath at 80° C. for forty hours.

Part II: Dispersion Preparation

The same procedure described in Example 32, Part II was followed, except using 2.89 parts by weight of TEA, 287 parts by weight of distilled water, and 218.00 parts by weight of the prepolymer prepared in Part I.

Part III: Tape Preparation

The dispersion prepared in Part II was used to prepare a tape sample as described above. The 180° Peel Adhesion and Shear Strength of the tape sample were tested as described above and are reported in Table 25.

Comparative Example C1

Part I: Prepolymer Preparation

The polyols, ARCOL PPG-4025 and ARCOL PPG-425, were dehydrated in-vacuo at 90° C.–100° C. overnight and cooled to room temperature before use. In a glass reaction vessel, 128.35 parts by weight of ARCOL PPG-4025, 6.76 parts by weight of ARCOL PPG-425, 3.98 parts by weight of DMPA, 68.10 parts by weight of anhydrous acetone, and 19.98 parts by weight of TDI were combined. The reaction vessel was rotated in a thermostated temperature bath at 80° C. for forty hours.

Part II: Dispersion Preparation

The same procedure described in Example 32, Part II was followed, except using 2.87 parts by weight of TEA, 286 parts by weight of distilled water, and 217.00 parts by weight of the prepolymer prepared in Part I.

Part III: Tape Preparation

The dispersion prepared in Part II was used to prepare a tape sample as described above. The 180° Peel Adhesion and Shear Strength of the tape sample were tested as described above and are reported in Table 25.

TABLE 25

| Example | 180° Peel Adhesion (N/dm) | Shear Strength (minutes) |
| --- | --- | --- |
| 33 | 3.74 | 10,000 |
| C1 | 72.4 | 5 |

Example 34
Part I: Prepolymer Preparation

The polyols, ACCLAIM 4200 and ARCOL PPG-425, were dehydrated in-vacuo at 90° C.–100 ° C. overnight and cooled to room temperature before use. In a glass reaction vessel, 91.68 parts by weight of ACCLAIM 4200, 22.92 parts by weight of ARCOL PPG-425, 2.64 parts by weight of DMPA, 61.10 parts by weight of anhydrous acetone, and 25.34 parts by weight of TDI were combined. The reaction vessel was rotated in a thermostated temperature bath at 80° C. for 45 hours.

Part II: Dispersion Preparation

The same procedure described in Example 32, Part II was followed, except using 1.86 parts by weight of TEA, 251 parts by weight of distilled water, and 190.00 parts by weight of the prepolymer prepared in Part I.

Part III: Tape Preparation

The dispersion prepared in Part II was used to prepare a tape sample as described above. The 180° Peel Adhesion and Shear Strength of the tape sample were tested as described above and are reported in Table 26.

Comparative Example C2
Part I: Prepolymer Preparation

The polyols, ARCOL PPG-4025 and ARCOL PPG-425, were dehydrated in-vacuo at 90° C.–100° C. overnight and cooled to room temperature before use. In a glass reaction vessel, 91.68 parts by weight of ARCOL PPG-4025, 22.92 parts by weight of ARCOL PPG-425, 2.63 parts by weight of DMPA, 60.90 parts by weight of anhydrous acetone, and 24.89 parts by weight of TDI were combined. The reaction vessel was placed in a LAUNDER-OMETER Model LEF (commercially available from Atlas Electric Devices Company; Chicago, Ill.) at 80° C. for 45 hours.

Part II: Dispersion Preparation

The same procedure described in Example 32, Part II was followed, except using 1.86 parts by weight of TEA, 251 parts by weight of distilled water, and 190.00 parts by weight of the prepolymer prepared in Part I.

Part III: Tape Preparation

The dispersion prepared in Part II was used to prepare a tape sample as described above. The 180° Peel Adhesion and Shear Strength of the tape sample were tested as described above and are reported in Table 26.

TABLE 26

| Example | 180° Peel Adhesion (N/dm) | Shear Strength (minutes) |
| --- | --- | --- |
| 34 | 25.6 | 10,000 |
| C2 | 1.8 | 3 |

Example 35
Part I: Preparation of Diol

The same procedure described in Example 21, Part I was followed.

Part II: Prepolymer Preparation and Solution Formation

In a glass reaction vessel, 125.00 parts by weight of the diol prepared in Part I and 9.57 parts by weight of TDI were placed. The mixture was stirred and heated at 90° C. for three hours. The mixture was then cooled to 40° C. and a 25.00 part by weight aliquot was removed. To the aliquot, 0.49 part by weight of TEA was added. The prepolymer mixture was slowly added to a stirred solution of 10.68 parts by weight of JEFFAMINE D-2000 dissolved in 75.0 parts by weight of 2-propanol. The solution was stirred overnight.

Part III: Tape Preparation

The solution prepared in Part II was used to prepare a tape sample as described above. The 180° Peel Adhesion and Shear Strength of the tape were tested as described above and are reported in Table 27.

TABLE 27

| Example | 180° Peel Adhesion (N/dm) | Shear Strength (minutes) |
| --- | --- | --- |
| 35 | 9.2 | 15.5 |

Example 36
Part I: Prepolymer Preparation

The polyol, ACCLAIM 3201, was dehydrated in-vacuo at 90° C.–100° C. overnight and cooled to room temperature before use. In a glass reaction vessel, 139.55 parts by weight of ACCLAIM 3201, 4.99 parts by weight of DMPA, 71.10 parts by weight of anhydrous acetone, and 21.52 parts by weight of TDI were combined. The reaction vessel was rotated in a thermostated temperature bath at 80° C. for forty hours.

Part II: Dispersion Preparation

A premix solution of 3.50 parts by weight of TEA and 289 parts by weight distilled water was prepared. Then, 220.00 parts by weight of the prepolymer prepared above was dispersed in the water/TEA mixture using a MICROFLUIDICS HOMOGENIZER Model # HC-5000 (commercially available from Microfluidics Corp.; Newton, Mass.) at an airline pressure of 0.621 MPa. The reaction mixture was stirred overnight at ambient temperature with a magnetic stir bar.

Part III: Tape Preparation

The dispersion prepared in Part II was used to prepare a tape sample as described above. The 180° Peel Adhesion and Shear Strength of the tape sample were tested as described above and are reported in Table 28.

TABLE 28

| Example | ACCLAIM 3201 (% by weight of polyol) | DMPA (% by weight of prepolymer) | 180° Peel Adhesion (N/dm) | Shear Strength (minutes) |
| --- | --- | --- | --- | --- |
| 36 | 100 | 3.0 | 55.6 | 10,000 |

Examples 37–41
Part I: Prepolymer Preparation

The polyol, ACCLAIM 3201, was dehydrated in-vacuo at 90° C.–100° C. overnight and cooled to room temperature prior to use. In a glass reaction vessel, 348.02 parts by weight of ACCLAIM 3201 and 111.32 parts by weight anhydrous acetone were combined and mixed until homogeneous (about five minutes). In a separate vessel, 15.73 parts by weight DMPA and 78.69 parts by weight NMP were combined and mixed until the DMPA was dissolved (about fifteen minutes). The DMPA/NMP solution was combined with polyol/MEK solution and the resulting mixture was mixed until homogeneous (about five minutes). To this mixture was added, sequentially, 78.98 parts by weight of IPDI and 0.70 part by weight of HFTC. After each addition the resulting mixture was mixed until homogeneous (about five minutes). The reaction mixture vessel was placed in an 80° C. oven for six hours and agitated intermittently.
Part II: Dispersion Preparation

Example 37

First, 6.37 parts by weight of NIREZ 2019 was dissolved in 3.20 parts by weight of anhydrous acetone. This solution was then combined with 170.00 parts by weight of the prepolymer made in Part I and mixed until homogeneous (about five minutes). A premix solution of 1.85 parts by weight of EDA, 3.19 parts by weight of TEA, and 229 parts by weight distilled water was prepared. The prepolymer/NIREZ mixture was dispersed in the water/EDA/TEA premix solution using a MICROFLUIDICS HOMOGENIZER Model # HC-5000 (commercially available from Microfluidics Corp.; Newton, Mass.) at an airline pressure of 0.621 MPa.

Examples 38–41

The same procedure described in Example 37, Part II was followed with the reagents shown in Table 29.

TABLE 29

| Example | NIREZ 2019 (parts by weight) | Acetone (parts by weight) | Prepolymer from Part I (parts by weight) | TEA (parts by weight) | EDA (parts by weight) | Water (parts by weight) |
|---|---|---|---|---|---|---|
| 38 | 13.45 | 6.70 | 170.00 | 3.19 | 1.94 | 252 |
| 39 | 30.24 | 15.12 | 170.00 | 3.84 | 1.94 | 282 |
| 40 | 51.84 | 26.00 | 170.00 | 3.83 | 1.94 | 322 |
| 41 | 80.70 | 40.00 | 170.00 | 4.14 | 1.94 | 375 |

Part III: Tape Preparation

The dispersions prepared in Part II were used to prepare tape samples as described above. The 180° Peel Adhesion and Shear Strength of each tape sample were tested as described above and are reported in Table 30.

TABLE 30

| Example | NIREZ 2019 (PHR) | 180° Peel Adhesion (N/dm) | Shear Strength (minutes) |
|---|---|---|---|
| 37 | 5 | 34.8 | 235 |
| 38 | 10 | 49.0 | 186 |
| 39 | 20 | 63.7 | 233 |
| 40 | 30 | 66.7 | 297 |
| 41 | 40 | 55.1 | 685 |

Example 42
Part I: Prepolymer Preparation

The polyol, ACCLAIM 4200, was dehydrated in-vacuo at 90° C.–100° C. overnight and cooled to room temperature before use. In a glass reaction vessel, 130.98 parts by weight of ACCLAIM 4200, 2.73 parts by weight of DMPA, 63.30 parts by weight of anhydrous acetone, and 14.19 parts by weight of TDI were combined. The reaction vessel was rotated in a thermostated temperature bath at 80° C. for 44 hours.

Part II: Dispersion Preparation

The same procedure used in Example 36, Part II was followed using 1.96 parts by weight of TEA, 264 parts by weight of distilled water and 200.00 parts by weight of the prepolymer prepared in Part I.

Part III: Tape Preparation

The dispersion prepared in Part II was used to prepare a tape sample as described above. The 1800 Peel Adhesion and Shear Strength of the tape sample were tested as described above and are reported in Table 31.

Comparative Example C3
Part I: Prepolymer Preparation

The polyol, ARCOL PPG-4025, was dehydrated in-vacuo at 90° C.–100° C. overnight and cooled to room temperature before use. In a glass reaction vessel, 130.98 parts by weight of ARCOL PPG-4025, 2.72 parts by weight of DMPA, 63.10 parts by weight of anhydrous acetone, and 13.56 parts by weight of TDI were combined. The reaction vessel was rotated in a thermostated temperature bath at 80° C. for 44 hours.

Part II: Dispersion Preparation

The same procedure used in Example 36, Part II was followed using 1.96 parts by weight of TEA, 264 parts by weight of distilled water and 200.00 parts by weight of the prepolymer prepared in Part I.

Part III: Tape Preparation

The dispersion prepared in Part II was used to prepare a tape sample as described above. The 180° Peel Adhesion and Shear Strength of the tape sample were tested as described above and are reported in Table 31.

TABLE 31

| Example | 180° Peel Adhesion (N/dm) | Shear Strength (minutes) |
|---|---|---|
| 42 | 33.9 | 10,000 |
| C3 | 114 (cohesive failure) | 2 |

Example 43
Part I: Preparation of Diol

In a glass reaction vessel equipped with a vacuum/nitrogen inlet and stirrer, 596.00 parts by weight (0.2932 OH equivalents) of ACCLAIM 6320 was placed. The flask was heated and stirred at 105° C. for one hour under vacuum then filled with nitrogen. Then, 10.08 parts by weight (0.09773 anhydride equivalents) of SA was added and the resulting mixture was heated and stirred at 140° C. for two hours. After two hours, infrared spectra showed no remaining absorption at the carbonyl peaks associated with the anhydride, 1788 and 1866 cm$^{-1}$.

Part II: Prepolymer Preparation and Dispersion

In a glass reaction vessel, 145.33 parts by weight of the diol prepared in Part I and 8.73 parts by weight of TDI were placed. The mixture was stirred and heated at 90° C. for three hours. Then, the mixture was cooled to 60° C. and a 25.00 part by weight aliquot was removed. To the aliquot, 0.34 part by weight of an amine (TEA) was added and the prepolymer mixture was immediately dispersed in 75.0 parts by weight of deionized water using an OMNI Mixer Homogenizer (commercially available from OMNI International; Warenton, Va.). The dispersion was stirred overnight.

Part III: Tape Preparation

The dispersion prepared in Part II was used to prepare a tape sample as described above. The 180° Peel Adhesion and Shear Strength of the tape were tested as described above and are reported in Table 33.

Example 44
Part I: Preparation of Diol

The same procedure and reagents used in Example 43, Part I, were used except that 18% fewer equivalents of SA was used (i.e. 0.1323 OH equivalents (from ACCLAIM 6320) and 0.03744 anhydride equivalents (from SA)).

Part II: Prepolymer Preparation and Dispersion

The same procedure used in Example 43, Part II, except using the reagents and amounts shown in Table 32 for each of three samples—Examples 44-1, 44-2, and 44-3. A catalyst (T-12) was added along with the diisocyanate in Examples 44-2 and 44-3. Furthermore, a 15.00 part by weight aliquot was obtained and the prepolymer was dispersed in 53.0 parts by weight deionized water for each sample. For Example 44-3, the second amine, JEFFAMINE D-2000, was then added to the initial dispersion.

TABLE 32

| Example | Diol from Part I (parts by weight) | TDI (parts by weight) | IPDI (parts by weight) | T-12 (parts by weight) | Amine (parts by weight) |
|---|---|---|---|---|---|
| 44-1 | 100.00 | 6.28 | 0 | 0 | TEA (0.20) |
| 44-2 | 125.00 | 0 | 10.22 | 0.08 | TEA (0.19) |
| 44-3 | 125.00 | 0 | 10.22 | 0.08 | JEFFAMINE D-2000 (4.10) TEA (0.19) |

Part III: Tape Preparation

The dispersion prepared in Part II was used to prepare a tape sample as described above. The 180° Peel Adhesion and Shear Strength of the tape were tested as described above and are reported in Table 33.

Example 45
Part I: Preparation of Diol

In a glass reaction vessel equipped with a vacuum/nitrogen inlet, 699.02 parts by weight (0.3489 equivalents of hydroxyl) of POLYG 85-29 was placed. The flask was heated at 105° C. for one hour under vacuum then filled with nitrogen. Then, 11.99 parts by weight (0.1163 equivalents of anhydride) of SA was added. The resulting mixture was heated at 140° C. for eight hours.

Part II: Prepolymer Preparation and Dispersion

In a glass reaction vessel, 250.00 parts by weight of the diol prepared in Part I and 14.95 parts by weight of TDI were placed. The mixture was stirred and heated at 85° C. for 4.5 hours. The resulting mixture was cooled to 60° C. and a 15.00 part by weight aliquot was removed. To the aliquot, 0.23 part by weight of TEA was added. The mixture was immediately dispersed in 75.0 parts by weight of deionized water using an OMNI Mixer Homogenizer (commercially available from OMI International; Warenton, Va.). The dispersion was stirred overnight.

Part II: Tape Preparation

The dispersion prepared in Part II was used to prepare a tape sample as described above. The 180° Peel Adhesion and Shear Strength of the tape were tested as described above and are reported in Table 33.

Example 46
Part I: Preparation of Diol

In a glass reaction vessel equipped with a vacuum/nitrogen inlet, 619.46 parts by weight (0.3975 equivalents of hydroxyl) of POLYG 85-36 was placed. The flask was heated at 105° C. for one hour under vacuum then filled with nitrogen. Then, 13.67 parts by weight (0.1325 equivalents of anhydride) of SA was added and the resulting mixture was heated at 150° C. for four hours. After four hours, an infrared spectra showed no remaining absorption at the carbonyl peaks associated with the anhydride, 1788 and 1866 cm$^{-1}$.

Part II: Prepolymer Preparation and Dispersion

The same procedure used in Example 43, Part II was followed, except using the reagents and amounts as described below for each of three samples—Examples 46-1, 46-2, and 46-3. For each of the samples, 125.00 parts by weight of the diol from Part I and 9.57 parts by weight TDI were used to form a prepolymer.

Furthermore, for Examples 46-1 and 46-2, a 35.00 part by weight aliquot of each sample was obtained and neutralized with 0.59 part by weight of TEA. Then, the aliquot was dispersed in 105.0 parts by weight of deionized water using an OMNI Mixer Homogenizer (commercially available from OMNI International; Warenton, Va.). Furthermore, for Example 46-2, 0.22 part by weight EDA was further dispersed into the dispersion. Each dispersion was stirred overnight.

For Example 46-3, the resulting prepolymer was heated to 95° C. and 22% by weight of a terpene resin tackifier (prepared as described in U.S. Pat. No. 3,718,712 (Tushaus), Example 1) was added. A 35.00 part by weight aliquot of the sample was obtained and neutralized with 0.59 part by weight of TEA. Then, the aliquot was dispersed in 105.0 parts by weight of deionized water using an OMNI Mixer Homogenizer (commercially available from OMNI International; Warenton, Va.). The dispersion was stirred overnight.

Part III: Tape Preparation

The dispersion prepared in Part II was used to prepare a tape sample as described above. The 180° Peel Adhesion and Shear Strength of the tape were tested as described above and are reported in Table 33.

Example 47
Part I: Preparation of Diol

In a glass reaction vessel equipped with a vacuum/nitrogen inlet, 699.03 parts by weight (0.3302 OH equivalents) of POLYG 83-26 was placed. The flask was heated at 105° C. for one hour under vacuum then filled with nitrogen. Then, 11.35 parts by weight (0.01101 anhydride equivalents) of SA was added and the resulting mixture was heated at 150° C. for nine hours.

Part II: Prepolymer Preparation and Dispersion

In a glass reaction vessel 250.00 parts by weight of the diol prepared in Part I and 14.17 parts by weight of TDI were placed. The mixture was stirred and heated at 85° C. for 4.5 hours. The resulting mixture was cooled to 55° C. and a 15.00 part by weight aliquot was removed. To the aliquot, 0.23 part by weight of TEA was added. The mixture was immediately dispersed in 53.0 parts by weight of deionized water using an OMNI Mixer Homogenizer (commercially available from OMNI International; Warenton, Va.). The dispersion was stirred overnight.

Part III: Tape Preparation

The dispersion prepared in Part II was used to prepare a tape sample as described above. The 180° Peel Adhesion and Shear Strength of the tape were tested as described above and are reported in Table 33.

Example 48
Part I: Preparation of Diol

In a glass reaction vessel equipped with a vacuum/nitrogen inlet, 348.76 parts by weight (0.1766 equivalents of hydroxyl) of VORANOL 232-028 was placed. The flask was heated at 105° C. for one hour under vacuum then filled with nitrogen. Then, 6.07 parts by weight (0.0589 equivalents of anhydride) of SA was added. The resulting mixture was heated at 150° C. for five hours.

Part II: Prepolymer Preparation and Dispersion

In a glass reaction vessel, 125.00 parts by weight of the diol prepared in Part I and 7.58 parts by weight of TDI were placed. The mixture was stirred and heated at 90° C. for three hours. The mixture was then cooled to 60° C. and a 30.00 part by weight aliquot was removed. To the aliquot, 0.48 part by weight of TEA was added. The prepolymer mixture was immediately dispersed in 100.0 parts by weight of deionized water using an OMNI Mixer Homogenizer (commercially available from OMNI International; Warenton, Va.). The dispersion was stirred overnight.

Part III: Tape Preparation

The dispersion prepared in Part II was used to prepare a tape sample as described above. The 180° Peel Adhesion and Shear Strength of the tape were tested as described above and are reported in Table 33.

Example 49

Part I: Preparation of Diol

In a glass reaction vessel equipped with a vacuum/nitrogen inlet and stirrer, 361.09 parts by weight (0.1809 OH equivalents) of ACCLAIM 6320 was placed. The flask was heated and stirred at 105° C. for one hour under vacuum then filled with nitrogen. Then, 11.11 parts by weight (0.06032 anhydride equivalents) of SBAA was added. The resulting mixture was heated and stirred at 110° C. for several minutes.

Part II: Prepolymer Preparation and Dispersion

In a glass reaction vessel, 112.07 parts by weight of the diol prepared in Part I and 6.64 parts by weight of TDI were placed The mixture was stirred and heated at 85° C. for two hours. The resulting mixture was cooled to 68° C. and a 25.00 part by weight aliquot was removed. The aliquot was dispersed into 38.2 parts by weight of 0.1 Molar aqueous sodium hydroxide (diluted in 37.0 parts by weight of deionized water) using an OMNI Mixer Homogenizer (commercially available from OMNI International; Warenton, Va.). The dispersion was stirred overnight.

Part III: Tape Preparation

The dispersion prepared in Part II was used to prepare a tape sample as described above. The 180° Peel Adhesion and Shear Strength of the tape were tested as described above and are reported in Table 33.

Example 50

Part I: Preparation of Diol

In a glass reaction vessel equipped with a vacuum/nitrogen inlet, 359.29 parts by weight (0.1742 OH equivalents) of ACCLAIM 6300 was placed. The contents of the reaction vessel were stirred and heated at 105° C. for one hour under vacuum. Then, the reaction vessel was filled with nitrogen. Next, 10.71 parts by weight (0.05815 equivalents of anhydride) of SBAA was added. The resulting mixture was stirred and heated at 105° C. for 40 minutes.

Part II: Prepolymer Preparation and Dispersion

In a glass reaction vessel, 120.00 parts by weight of the diol prepared in Part I and 6.90 parts by weight of TDI were placed. The mixture was stirred and heated at 85° C. for 6.5 hours. The resulting mixture was cooled to 75° C. and a 25.00 part by weight aliquot was removed. The prepolymer mixture was immediately dispersed in 3.73 parts by weight of 0.1 Molar aqueous sodium hydroxide (diluted in 46.0 parts by weight of deionized water) using an OMNI Mixer Homogenizer (commercially available from OMNI International; Warenton, Va.). The dispersion was stirred overnight.

Part III: Tape Preparation

First, 10.78 parts by weight of the dispersion prepared in Part II was diluted with 6.09 parts by weight of water. This dispersion was then used to prepare a tape sample as described above. The 180° Peel Adhesion and Shear Strength of the tape were tested as described above and are reported in Table 33.

TABLE 33

| Example | 180° Peel Adhesion (N/dm) | Shear Strength (minutes) |
| --- | --- | --- |
| 43 | 32.4 | 10,000 |
| 44-1 | 36.3 | 10,000 |
| 44-2 | 5.9 | 2,700* |
| 44-3 | 25.2 | 60 |
| 45 | 18.4 | 10,000 |
| 46-1 | 9.6 | 722 |
| 46-2 | 15.5 | 10,000 |
| 46-3 | 21.7 | 294 |
| 47 | 5.0 | 1 |
| 48 | 6.1 | 10,000 |
| 49 | 24.9 | 653 |
| 50 | 12.2 | 150 |

*Denotes partial adhesive failure

Example 51

Part I: Preparation of Diol

The same procedure described in Example 46, Part I was followed.

Part II: Prepolymer Preparation and Solution Formation

In a glass reaction vessel, 125.00 parts by weight of the diol prepared in Part I and 9.57 parts by weight of TDI were placed. The mixture was stirred and heated at 90° C. for three hours. The mixture was then cooled to 40° C. and a 25.00 part by weight aliquot was removed. To the aliquot, 0.49 part by weight of TEA was added. The prepolymer mixture was slowly added to a stirred solution of 10.68 parts by weight of JEFFAMINE D-2000 dissolved in 75.0 parts by weight of 2-propanol. The solution was stirred overnight.

Part III: Tape Preparation

The solution prepared in Part II was used to prepare a tape sample as described above. The 180° Peel Adhesion and Shear Strength of the tape were tested as described above and are reported in Table 34.

TABLE 34

| Example | 180° Peel Adhesion (N/dm) | Shear Strength (minutes) |
| --- | --- | --- |
| 51 | 9.2 | 15.5 |

Various modifications and alterations of the invention will become apparent to those skilled in the art without departing from the spirit and scope of the invention, which is defined by the accompanying claims. It should be noted that steps recited in any method claims below do not necessarily need to performed in the order that they are recited. Those of ordinary skill in the art will recognize variations in performing the steps from the order in which they are recited.

What is claimed is:

1. A polyurethane-based pressure-sensitive adhesive comprising the reaction product of:
   a polyol component comprising at least one diol having a weight average molecular weight of at least about 3000, wherein the at least one diol comprises less than about 8 weight % monols;

an isocyanate-functional component;

an optional reactive emulsifying compound; and an optional chain extending agent;

wherein the adhesive is prepared from a waterborne system.

2. The polyurethane-based pressure-sensitive adhesive of claim 1, further comprising the reaction product of a chain extending agent.

3. The polyurethane-based pressure-sensitive adhesive of claim 1, wherein each polyol in the polyol component is a diol.

4. The polyurethane-based pressure-sensitive adhesive of claim 1, wherein the polyol component comprises at least one polyoxyalkylene polyol.

5. The polyurethane-based pressure-sensitive adhesive of claim 1, wherein the polyol component comprises a first polyol having a weight average molecular weight of less than 2,000 and a second polyol having a weight average molecular weight of 3000 or more.

6. The polyurethane-based pressure-sensitive adhesive of claim 5, wherein the first polyol has a weight average molecular weight of less than about 1,800.

7. The polyurethane-based pressure-sensitive adhesive of claim 5, wherein the first polyol has a weight average molecular weight of less than about 1,000.

8. The polyurethane-based pressure-sensitive adhesive of claim 5, wherein the second polyol has a weight average molecular weight of greater than about 6,000.

9. The polyurethane-based pressure-sensitive adhesive of claim 5, wherein the weight average molecular weights of the first and second polyols differ by at least about 500.

10. The polyurethane-based pressure-sensitive adhesive of claim 5, wherein the weight average molecular weights of the first and second polyols differ by at least about 2,500.

11. The polyurethane-based pressure-sensitive adhesive of claim 5, wherein the second polyol comprises a majority of the polyol component based on total weight of the polyol component.

12. The polyurethane-based pressure-sensitive adhesive of claim 5, wherein the first polyol comprises about 1 to about 40 percent by weight of the polyol component and the second polyol comprises about 60 to about 99 percent by weight of the polyol component.

13. The polyurethane-based pressure-sensitive adhesive of claim 5, wherein the first polyol comprises about 5 to about 25 percent by weight of the polyol component and the second polyol comprises about 75 to about 95 percent by weight of the polyol component.

14. The polyurethane-based pressure-sensitive adhesive of claim 5, wherein the at least one diol comprises the second polyol of the polyol component.

15. The polyurethane-based pressure-sensitive adhesive of claim 1, wherein the isocyanate-functional component comprises a diisocyanate.

16. The polyurethane-based pressure-sensitive adhesive of claim 1, wherein the reactive emulsifying compound comprises at least about 0.5% by weight of the total reactants.

17. The polyurethane-based pressure-sensitive adhesive of claim 1, wherein the polyol component comprises less than about 10% by weight of polyols other than diols.

18. The polyurethane-based pressure-sensitive adhesive of claim 1, wherein the polyol component comprises less than about 5% by weight of polyols other than diols.

19. The polyurethane-based pressure-sensitive adhesive of claim 1, wherein the adhesive is prepared from a poly (urethane-urea) dispersion.

20. A substrate at least partially coated with the polyurethane-based pressure-sensitive adhesive of claim 1.

21. A tape comprising:

a backing having a first and second side; and the pressure-sensitive adhesive of claim 1 coated on at least a portion of the first side of the backing and, optionally, on at least a portion of the second side of the backing.

22. A method of preparing a polyurethane-based pressure-sensitive adhesive comprising the steps of:

providing a polyol component comprising at least one diol having a weight average molecular weight of at least about 3,000, wherein the at least one diol comprises less than about 8 weight % monols;

providing an isocyanate-functional component;

optionally providing a reactive emulsifying compound;

allowing the polyol component, the isocyanate-functional component, and the optional reactive emulsifying compound to react to form a polyurethane prepolymer;

dispersing the polyurethane prepolymer in a dispersing medium comprising water; and chain extending the polyurethane prepolymer.

23. The method of claim 22, further comprising the step of drying the dispersing medium to form a coating of the polyurethane-based pressure-sensitive adhesive.

* * * * *

UNITED STATES PATENT AND TRADEMARK OFFICE
CERTIFICATE OF CORRECTION

PATENT NO.    : 6,518,359 B1
DATED         : February 11, 2003
INVENTOR(S)   : Clemens, Lawrence M.

It is certified that error appears in the above-identified patent and that said Letters Patent is hereby corrected as shown below:

Title page,
Item [56], References Cited, delete "Tashaus" and insert in place thereof -- Tushaus --.

Column 2,
Line 49, delete "PSAS" and insert in place thereof -- PSAs --.

Column 5,
Line 24, delete "waterbome" and insert in place thereof -- waterborne --.

Column 6,
Line 13, delete "thereof" and insert in place thereof -- thereof. --.

Column 8,
Lines 8 and 23, delete "thereof" and insert in place thereof -- thereof. --.

Column 10,
Lines 15 and 25, delete "thereof" and insert in place thereof -- thereof. --.
Line 35, delete "2, 6-tolyene" and insert in place thereof -- 2,6, toluene --.
Line 36, delete "2,5-tolyene" and insert in place thereof -- 2,5- toluene --.
Line 37, delete "2,4-tolyene" and insert in place thereof -- 2,4- toluene --.
Lines 50 and 52, delete "tolyene" and insert in place thereof -- toluene --.
Line 52, delete "2,4-tolyene" and insert in place thereof -- 2,4- toluene --.
Line 59, delete "thereof" and insert in place thereof -- thereof. --.
Line 59, delete "2,6-tolyene" and insert in place thereof -- 2,6- toluene --.
Line 60, delete "2,4-tolyene" and insert in place thereof -- 2,4- toluene --.

Column 12,
Line 20, delete "X-Y," and insert in place thereof -- X,Y, --.

Column 14,
Line 9, delete "beadslbubbles" and insert in place thereof -- beads/bubbles --.
Line 10, delete "polyamides" and insert in place thereof -- polyaramids --.
Line 30, delete "solventbome" and insert in place thereof -- solventborne--.

Column 17,
Line 49, delete "ThA" and insert in place thereof --TEA --.

UNITED STATES PATENT AND TRADEMARK OFFICE
CERTIFICATE OF CORRECTION

PATENT NO. : 6,518,359 B1
DATED : February 11, 2003
INVENTOR(S) : Clemens, Lawrence M.

It is certified that error appears in the above-identified patent and that said Letters Patent is hereby corrected as shown below:

Column 19,
Line 22, delete "Part ," and insert in place thereof -- Part I, --.
Line 67, delete "FDA" and insert in place thereof -- EDA --.

Column 22,
Table 8, column 4, insert -- Acetone -- before "(parts by weight)".
Table 8, column 5, delete "Acetone" and insert in place thereof -- DMPA --.
Table 8, column 6, delete "DMPA" and insert in place thereof -- IPDI --.
Table 8, column 7, delete "IPDI FASCAT" and insert in place thereof -- FASCAT --.

Column 24,
Line 41, delete "Part I 2.06" and insert in place thereof -- Part I, 2.06 --.

Column 25,
Line 25, after "TEA," insert -- 3.01 parts by weight --.

Column 26,
Line 35, delete "hours" and insert in place thereof -- hours followed by --.

Column 27,
Line 45, delete "Part," and insert in place thereof -- Part I, --.

Column 31,
Line 14, delete "Part III" and insert in place thereof -- Part II --.
Line 57, delete "(% of" and insert in place thereof -- (% by --.

Column 32
Line 5, delete "(% of" and insert in place thereof -- (% by --.
Table 24, column 1, line 11, insert -- 1 -- before "ACCLAIM".

Column 33,
Line 6, delete "3.74" and insert in place thereof -- 37.4 --.

UNITED STATES PATENT AND TRADEMARK OFFICE
CERTIFICATE OF CORRECTION

PATENT NO. : 6,518,359 B1
DATED : February 11, 2003
INVENTOR(S) : Clemens, Lawrence M.

It is certified that error appears in the above-identified patent and that said Letters Patent is hereby corrected as shown below:

Column 36,
Line 8, delete "1800" and insert in place thereof -- 180° --.

Column 37,
Line 56, delete "OMI" and insert in place thereof -- OMNI --.
Line 58, delete "Part II" and insert in place thereof -- Part III --.

Column 39,
Line 35, delete "placed" and insert in place thereof -- placed. --.

Column 40,
Line 58, delete "to" and insert in place thereof -- to be --.

Column 41,
Line 20, delete "3000" and insert in place thereof -- 3,000 --.

Signed and Sealed this

Third Day of August, 2004

JON W. DUDAS
*Acting Director of the United States Patent and Trademark Office*